US012598246B2

(12) United States Patent
Kim et al.

(10) Patent No.: US 12,598,246 B2
(45) Date of Patent: Apr. 7, 2026

(54) ELECTRONIC DEVICE INCLUDING ANTENNA

(71) Applicant: SAMSUNG ELECTRONICS CO., LTD., Suwon-si (KR)

(72) Inventors: Yongyoun Kim, Suwon-si (KR); Myunghoon Kwak, Suwon-si (KR); Raetae Kim, Suwon-si (KR); Gisoo Lim, Suwon-si (KR); Byounguk Yoon, Suwon-si (KR); Hyunju Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 670 days.

(21) Appl. No.: 17/993,423

(22) Filed: Nov. 23, 2022

(65) Prior Publication Data

US 2023/0092831 A1     Mar. 23, 2023

Related U.S. Application Data

(63) Continuation of application No. PCT/KR2021/004909, filed on Apr. 20, 2021.

(30) Foreign Application Priority Data

May 25, 2020     (KR) ........................ 10-2020-0062175

(51) Int. Cl.
*H04M 1/02*          (2006.01)
(52) U.S. Cl.
CPC ....... *H04M 1/0235* (2013.01); *H04M 1/0268* (2013.01)
(58) Field of Classification Search
CPC .. H04M 1/0235; H04M 1/0268; H04M 1/026; H04M 1/0237; H04M 1/0239;
(Continued)

(56) References Cited

U.S. PATENT DOCUMENTS 10,833,397 B2 * 11/2020 Lee ........................ H01Q 1/521
11,025,761 B1 * 6/2021 Shim ................... H04M 1/0202
(Continued)

FOREIGN PATENT DOCUMENTS

KR     10-2012-0020088 A     3/2012
KR     10-2016-0027700 A     3/2016
(Continued)

OTHER PUBLICATIONS

Communication dated Mar. 10, 2024, issued by the Korean Intellectual Property Office in Korean Patent Application No. 10-2020-0062175.
(Continued)

*Primary Examiner* — Angelica Perez
(74) *Attorney, Agent, or Firm* — Sughrue Mion, PLLC

(57)          ABSTRACT

An electronic device may include: a housing which is at least partially made of a conductive material, and has a first surface facing a first direction, a second surface facing a second direction opposite to the first surface, and at least one side surface surrounding a space between the first surface and the second surface; a slide plate coupled to the housing so as to be slidable in a third direction perpendicular to the first direction; a flexible display which is disposed to be at least partially supported by the slidable plate; multiple conductive parts formed to be electrically segmented by at least one first non-conductive part formed on the at least one side surface along the third direction, and at least one second non-conductive part formed to cross over the first non-conductive part; a substrate disposed in the space; and a wireless communication circuit disposed on the substrate and configured to transmit and receive a wireless signal through the multiple conductive parts in at least one frequency band.

15 Claims, 31 Drawing Sheets

(58) Field of Classification Search
CPC ............. H04M 1/0269; H04M 1/0274; H04M
1/0277; H01Q 5/40; H01Q 1/243; H01Q
1/38
See application file for complete search history.

(56) References Cited

U.S. PATENT DOCUMENTS

| | | | |
|---|---|---|---|
| 2012/0050114 A1 | 3/2012 | Li et al. | |
| 2016/0064820 A1 | 3/2016 | Kim et al. | |
| 2016/0352015 A1 | 12/2016 | Roh et al. | |
| 2017/0142241 A1* | 5/2017 | Kim | H01Q 9/30 |
| 2017/0149127 A1* | 5/2017 | Li | H01Q 9/42 |
| 2018/0366812 A1 | 12/2018 | Kim et al. | |
| 2018/0375973 A1 | 12/2018 | Song et al. | |
| 2019/0182974 A1 | 6/2019 | Baek et al. | |
| 2019/0267699 A1 | 8/2019 | Kim et al. | |
| 2020/0051468 A1 | 2/2020 | Jung et al. | |
| 2020/0119429 A1 | 4/2020 | Park et al. | |
| 2020/0187368 A1 | 6/2020 | Lee et al. | |
| 2021/0037126 A1 | 2/2021 | Yoo et al. | |
| 2021/0111484 A1 | 4/2021 | Jang et al. | |
| 2021/0219437 A1 | 7/2021 | Kim et al. | |
| 2021/0336356 A1* | 10/2021 | Choi | G06F 1/1652 |

FOREIGN PATENT DOCUMENTS

| | | | | | |
|---|---|---|---|---|---|
| KR | 10-2016-0139474 A | 12/2016 | | | |
| KR | 10-2017-0056292 A | 5/2017 | | | |
| KR | 10-2018-0031424 A | 3/2018 | | | |
| KR | 10-2018-0060299 A | 6/2018 | | | |
| KR | 10-2018-0074395 A | 7/2018 | | | |
| KR | 10-2018-0104517 A | 9/2018 | | | |
| KR | 10-2018-0121218 A | 11/2018 | | | |
| KR | 10-2018-0137993 A | 12/2018 | | | |
| KR | 10-2019-0097553 A | 8/2019 | | | |
| KR | 10-2019-0102895 A | 9/2019 | | | |
| KR | 10-2019-0143029 A | 12/2019 | | | |
| KR | 20190143029 A | * | 12/2019 | .......... | H04M 1/0249 |
| KR | 10-2020-0018282 A | 2/2020 | | | |
| KR | 20200018282 A | * | 2/2020 | .......... | H04M 1/0216 |
| KR | 10-2020-0042611 A | 4/2020 | | | |

OTHER PUBLICATIONS

Communication dated Aug. 4, 2021, issued by the International Searching Authority in counterpart International Application No. PCT/KR2021/004909 (PCT/ISA/210).

Communication dated Aug. 4, 2021, issued by the International Searching Authority in counterpart International Application No. PCT/KR2021/004909 (PCT/ISA/237).

Communication dated Aug. 31, 2023 issued by the European Patent Office in counterpart European Application No. 21814083.8.

Communication dated Jun. 23, 2025 issued by the European Patent Office in European Patent Application No. 21814083.8.

Communication dated Jan. 30, 2026, issued by the European Patent Office in European Application No. 21 814 083.8.

* cited by examiner

ELECTRONIC DEVICE INCLUDING ANTENNA

CROSS-REFERENCE TO RELATED APPLICATIONS

This application is a bypass continuation application of International Application No. PCT/KR2021/004909, which was filed on Apr. 20, 2021, claiming priority to Korean Patent Application No. 10-2020-0062175, filed on May 25, 2020, in the Korean Intellectual Property Office, the disclosures of which are incorporated by reference herein in their entireties.

BACKGROUND

1. Field

The disclosure relates to an electronic device including an antenna.

2. Related Art

Electronic devices have been made slimmer, and have been improved to have increased rigidity, reinforced design aspects, and differentiated functional elements. Electronic devices have evolved from unilaterally rectangular shapes to more diversified shapes. An electronic device may have a deformable structure such that a large-screen display can be used while ensuring portability. As an example of the deformable structure, an electronic device may have a structure (for example, rollable structure) in which the display area can be expanded by a flexible display supported by at least two housings operating in sliding types. Such an electronic device may be required to have a structure in which an electronic component (for example, antenna) can be efficiently disposed without interfering with flexible display deforming operations through sliding operations of the at least two housings.

SUMMARY

Electronic devices may include a deformable rollable type electronic device (hereinafter, referred to as "rollable electronic device") configured such that, when used, the display area of a flexible display can be expanded. The rollable electronic device may include a first housing and a second housing (or sliding plate), which may be coupled to be able to move with regard to each other in an at least partially fitted together manner. For example, the second housing or sliding plate may support at least a part of a flexible display (or extendable display), may be coupled to the first housing to be able to slide at least partially, and may be manually opened/closed by the user or may automatically transition to a drawn-in state and a drawn-out state through an internal driving mechanism, thereby inducing the display area to vary.

An electronic device may include multiple antennas (for example, antenna radiators) for transmitting and receiving radio signals in various frequency bands. There is a limit to the increasing number of antennas that electronic devices (which have become slimmer) can accommodate. In an attempt to overcome this limit, it has been proposed to segment a part of a conductive side frame through a non-conductive material (for example, through injection or structural coupling), thereby using the same as an antenna.

However, a part of the conductive side frame of a rollable electronic device needs to move from the housing in a sliding type while supporting the display, and thus cannot be used as an antenna, thereby inevitably having a limited disposition space. In addition, if an antenna is applied to a metal structure related to sliding operations, electric connection with the substrate may become unstable, thereby degrading the device reliability.

Various embodiments of the disclosure may provide an electronic device including an antenna.

Various embodiments of the disclosure may provide an electronic device having an antenna disposition structure which may correspond to various frequency bands.

Various embodiments of the disclosure may provide an electronic device including an antenna having a stable electric connection structure between the antenna and the substrate.

According to an aspect of the disclosure, an electronic device may include: a housing including a first surface oriented in a first direction, a second surface oriented in a second direction opposite to the first surface, and at least one side surface surrounding a space between the first surface and the second surface, the housing being at least partially formed of a conductive material; a slide plate coupled to the housing so as to be slidable in a third direction perpendicular to the first direction; a flexible display disposed to be at least partially supported by the slide plate; multiple conductive portions formed to be electrically segmented by at least one first non-conductive portion formed along the third direction and at least one second non-conductive portion formed to cross the first non-conductive portion, on the at least one side surface; a substrate disposed in the space; and a wireless communication circuit disposed on the substrate and configured to transmit and receive a wireless signal in at least one frequency band through the multiple conductive portions.

The electronic device further includes: at least one connection terminal electrically connected to the substrate and disposed to face the multiple conductive portions.

The multiple conductive portions include a first conductive portion and a second conductive portion disposed to be spaced apart from the first conductive portion, and the at least one connection terminal includes a first connection terminal electrically connected to the first conductive portion and a second connection terminal electrically connected to the second conductive portion.

The first connection terminal and the second connection terminal may be arranged on a line along the third direction. Alternatively, the first connection terminal and the second connection terminal may be arranged on lines different from each other along the third direction.

At least one of the first connection terminal and the second connection terminal is disposed to face the at least one side surface from the substrate.

At least one of the first connection terminal and the second connection terminal is disposed to be oriented in the second direction from the substrate.

The electronic device further includes: a conductive connection structure extending from at least one of the first conductive portion and the second conductive portion to at least one of the first connection terminal and the second connection terminal, wherein at least one of the first connection terminal and the second connection terminal is electrically connected to at least one of the first conductive portion and the second conductive portion through the conductive connection structure.

The conductive connection structure includes a conductive connection part integrally formed with at least one of the first conductive portion and the second conductive portion.

The conductive connection structure includes a conductive connection member connecting at least one of the first conductive portion and the second conductive portion to at least one of the first connection terminal and the second connection terminal.

The conductive connection member includes a conductive pin or a conductive screw having a designated length.

The electronic device further includes: a bracket housing which is disposed to support at least a part of the slide plate, in the space, and has an inner space, wherein the substrate is disposed in the inner space.

The at least one connection terminal is exposed from the substrate to a bracket side surface of the bracket housing, which faces the at least one side surface, so as to be electrically connected to at least one of the multiple conductive portions.

The at least one connection terminal is exposed from the substrate to the bracket rear surface of the bracket housing, which faces the second surface, so as to be electrically connected to at least one of the multiple conductive portions.

The electronic device further includes: a side cover disposed on the at least one side surface, where the at least one first non-conductive portion, the at least one second non-conductive portion, and the multiple conductive portions, which are formed on the at least one side surface, are not exposed to the outside through the side cover.

The slide plate is configured to be withdrawn from a side surface of the housing so as to expand a display area of the flexible display from a slide-in state to a slide-out state, where the multiple conductive portions maintain an electric connection with the substrate when switching the flexible display from the slide-in state to the slide-out state.

The multiple conductive portions are electrically segmented by at least one first non-conductive portion to form conductive portions having different electric lengths.

The multiple conductive portions are configured to operate as antennas in various frequency bands.

The multiple conductive portions are electrically connected to the wireless communication circuit.

The electronic device further includes: a driving mechanism, disposed in the space, configured to control an operation of the slide plate, wherein the multiple conductive portions are disposed in at least a partial area of the at least one side surface that is not involved in the driving mechanism.

However, the technical aspects are not limited to the foregoing aspects, and there may be other technical aspects.

According to various embodiments of the disclosure, antennas capable of operating in various frequency bands may be provided by providing conductive parts having various electric lengths formed through multiple nonconductive parts disposed so as to least partially intersect with each other in at least a partial area of a side frame that is not involved in a driving mechanism, and a structure capable of securing reliable electric connection with the substrate even in a case of switching to a drawn-out state and/or a drawn-in state may be provided.

BRIEF DESCRIPTION OF DRAWINGS

The above and other aspects, features, and advantages of certain embodiments of the present disclosure will be more apparent from the following description taken in conjunction with the accompanying drawings, in which:

4

Figure 1:
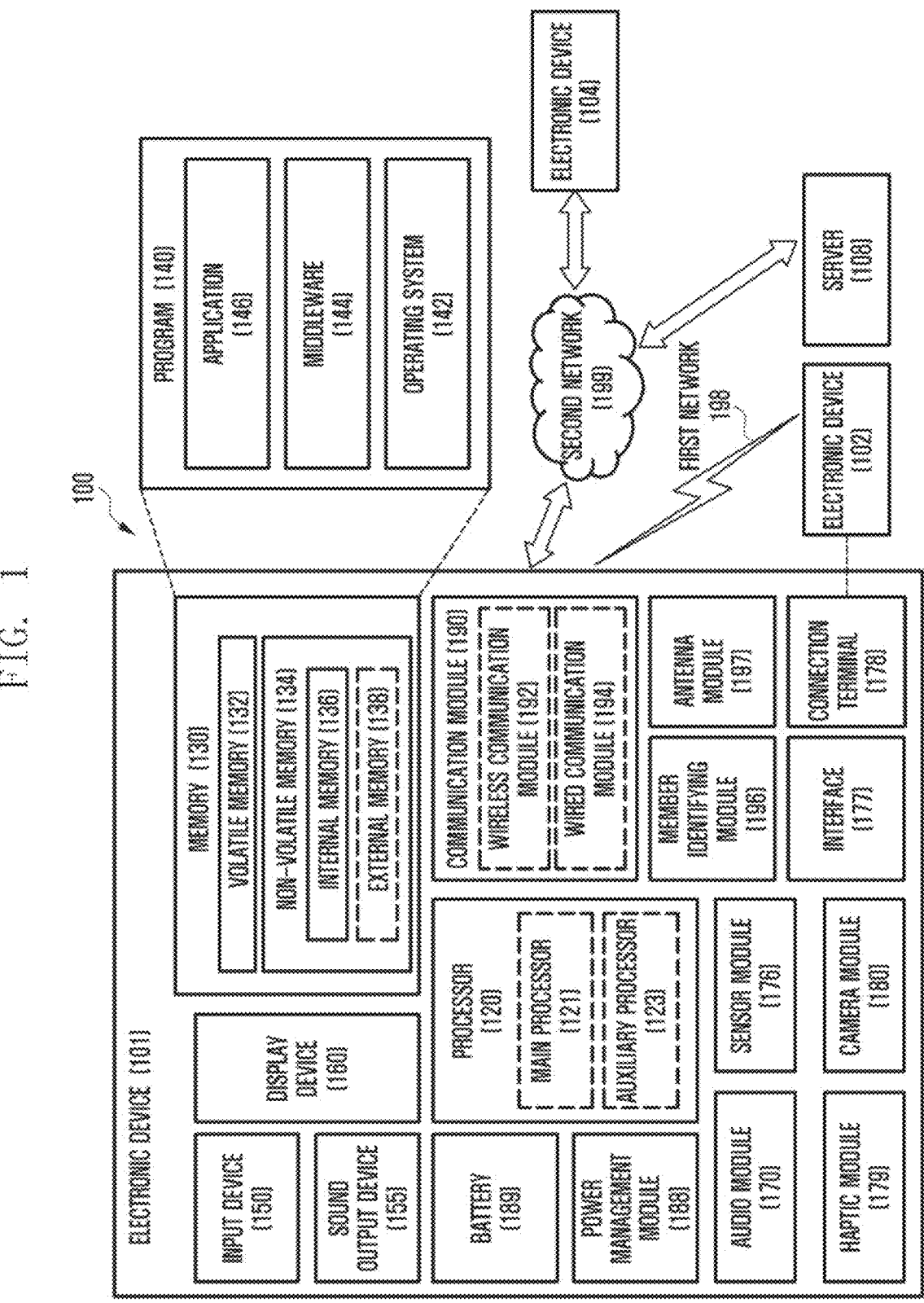
Figure 2A:
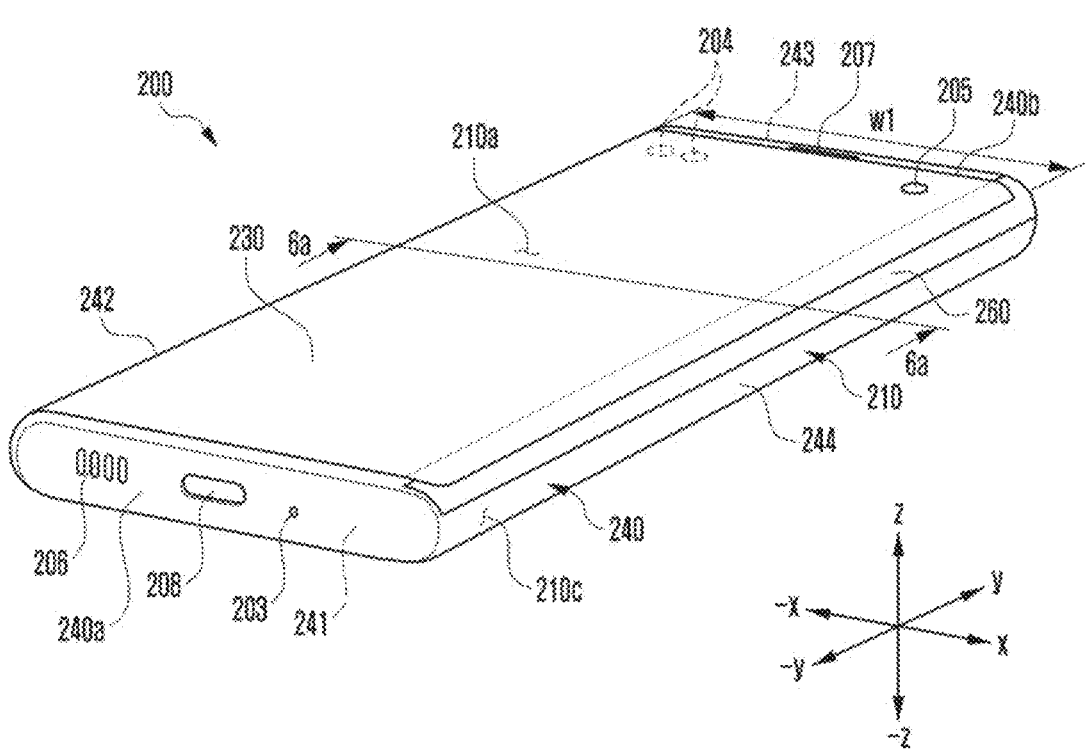
Figure 2B:
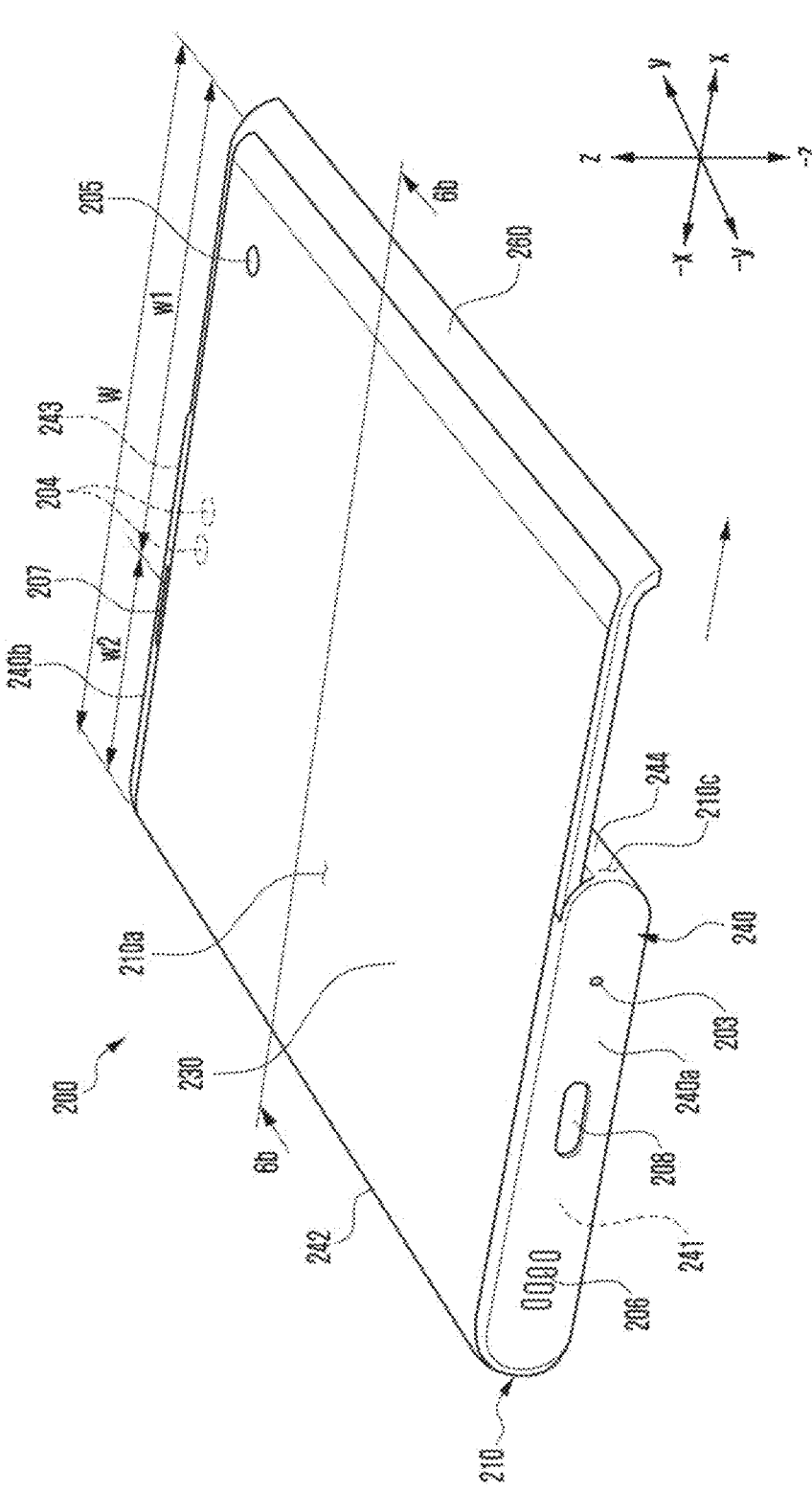
Figure 3A:
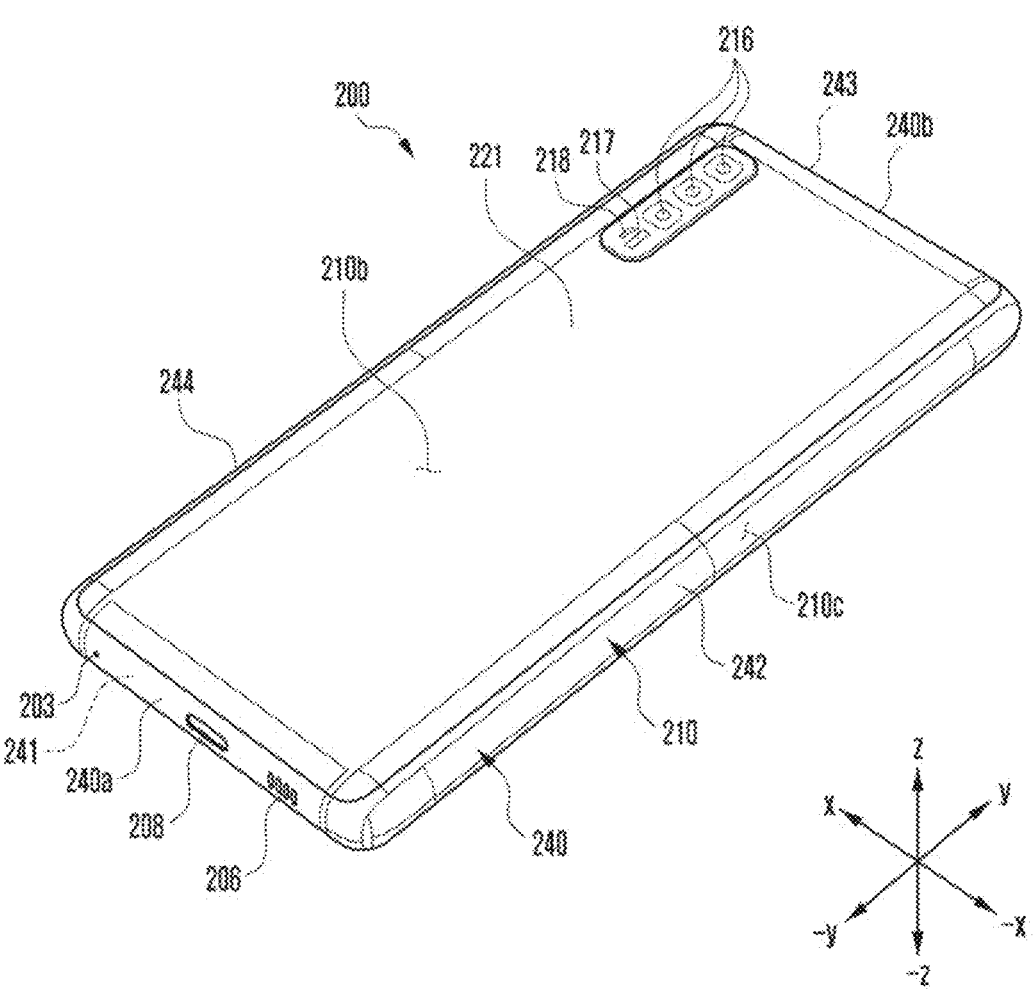
Figure 4:
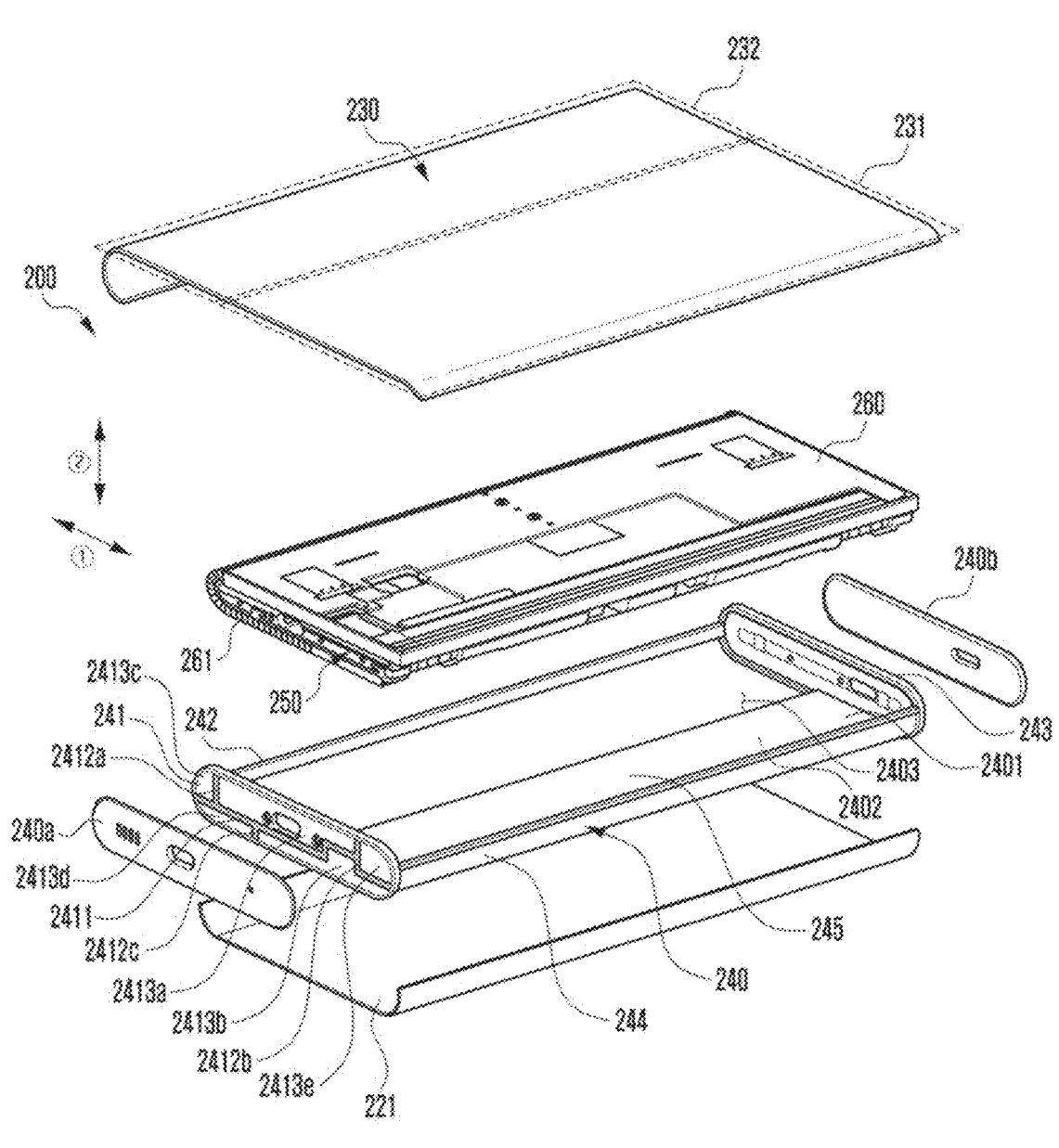
Figure 5A:
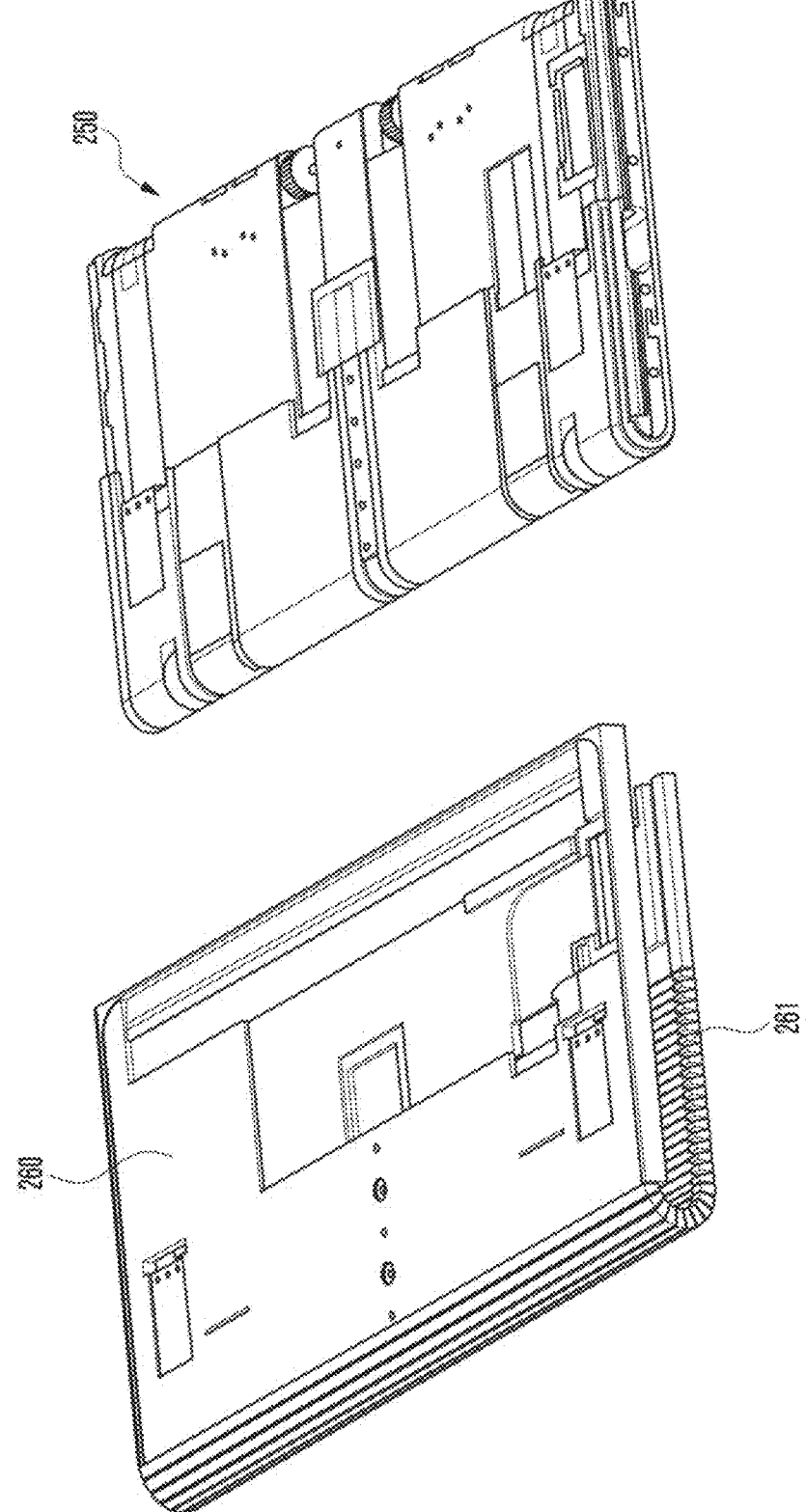
Figure 5B:
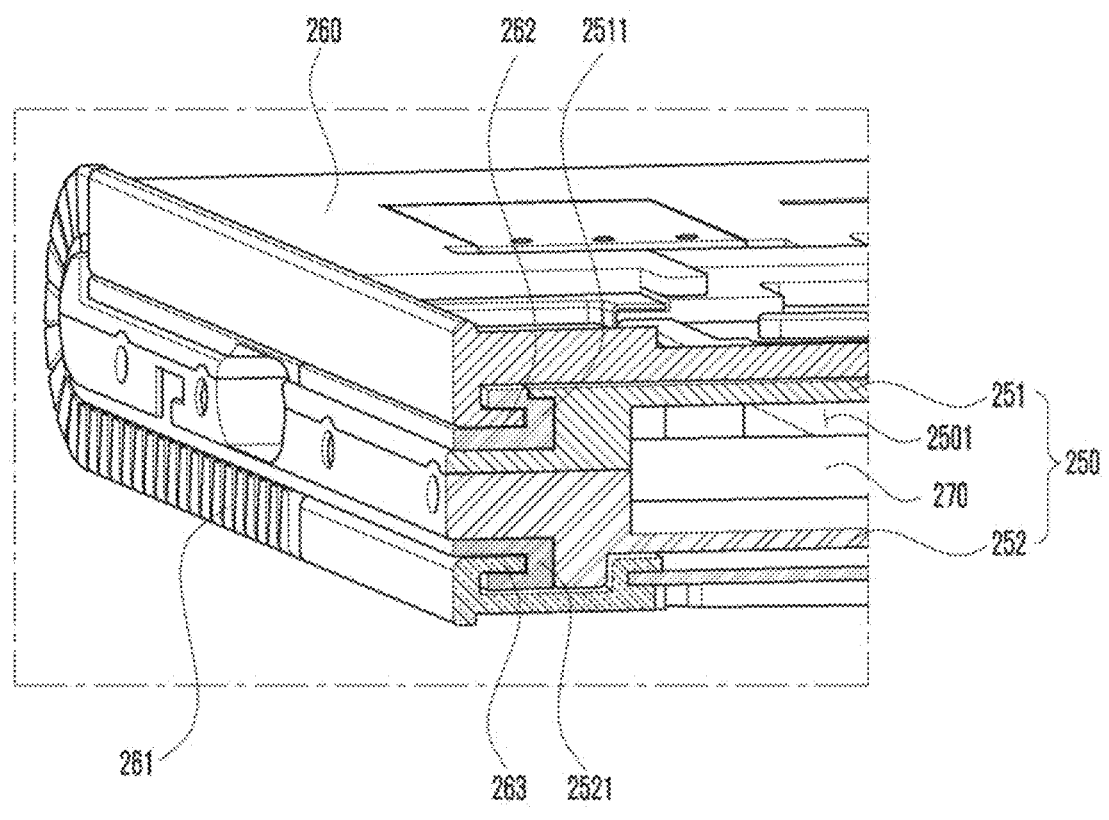
Figure 6A:
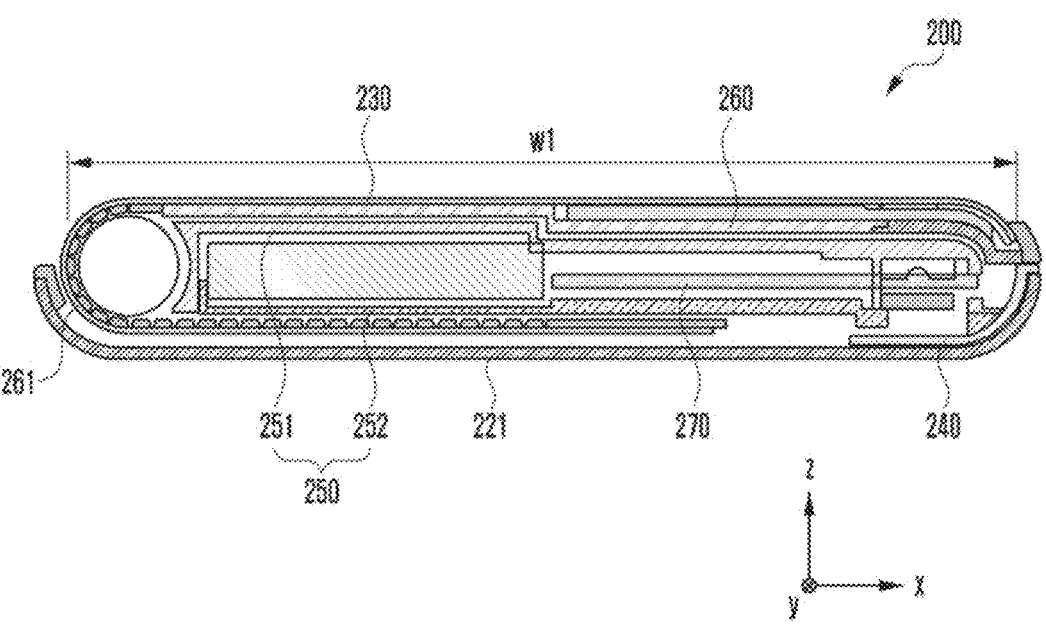
Figure 7A:
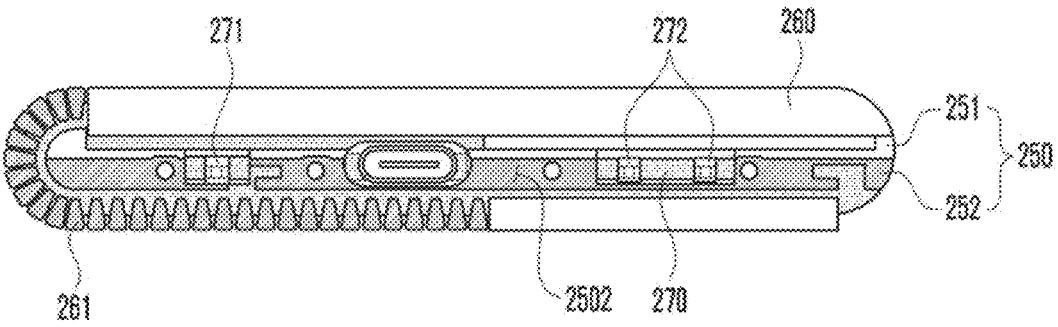
Figure 7B:
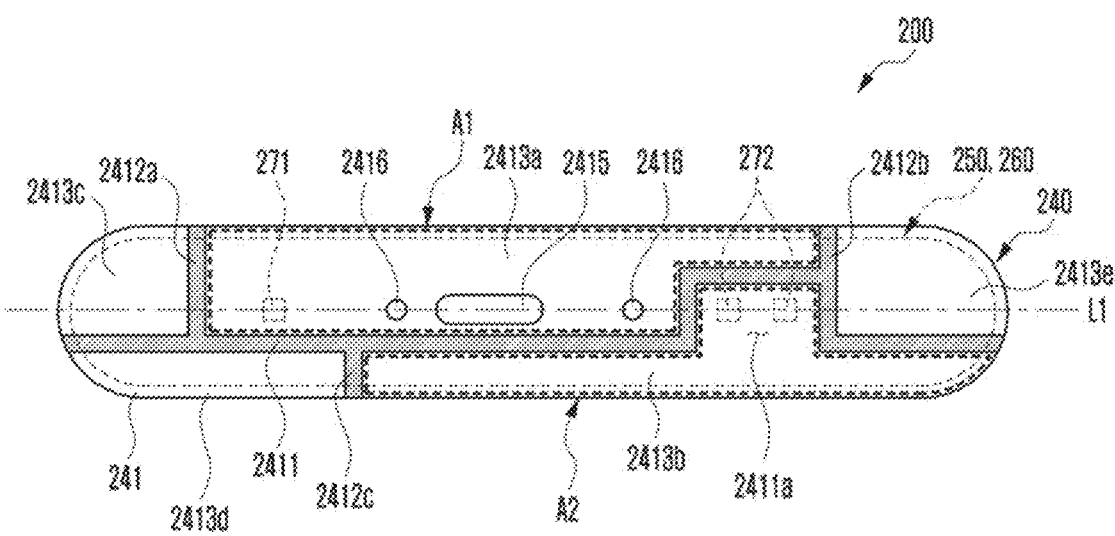
Figure 7C:
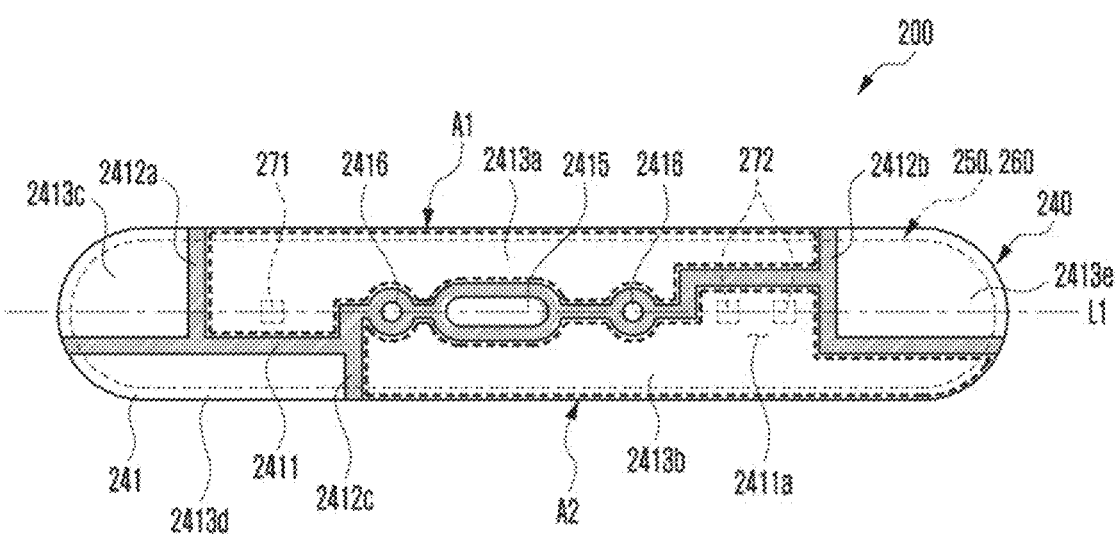
Figure 8A:
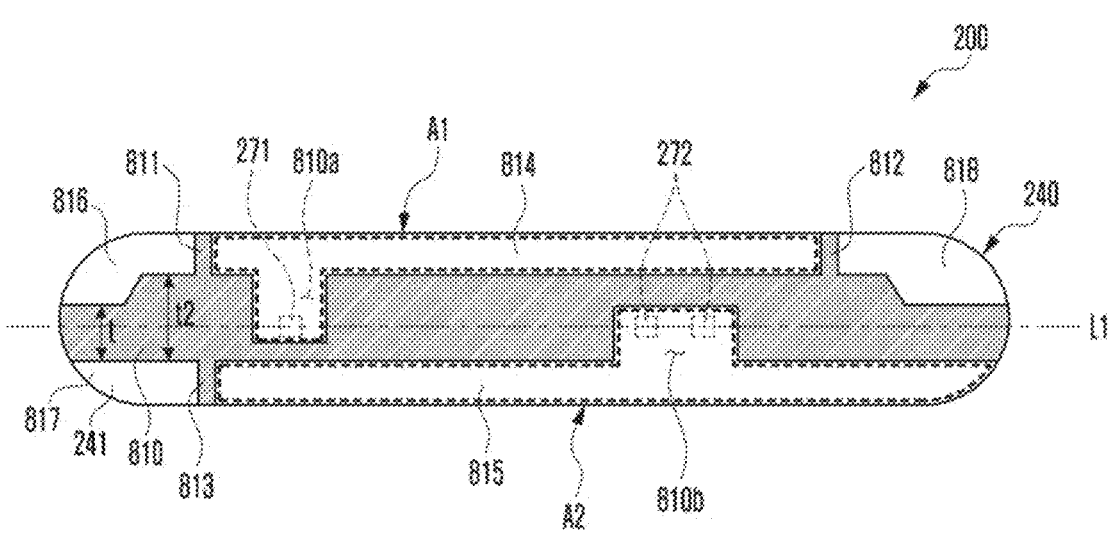
Figure 8B:
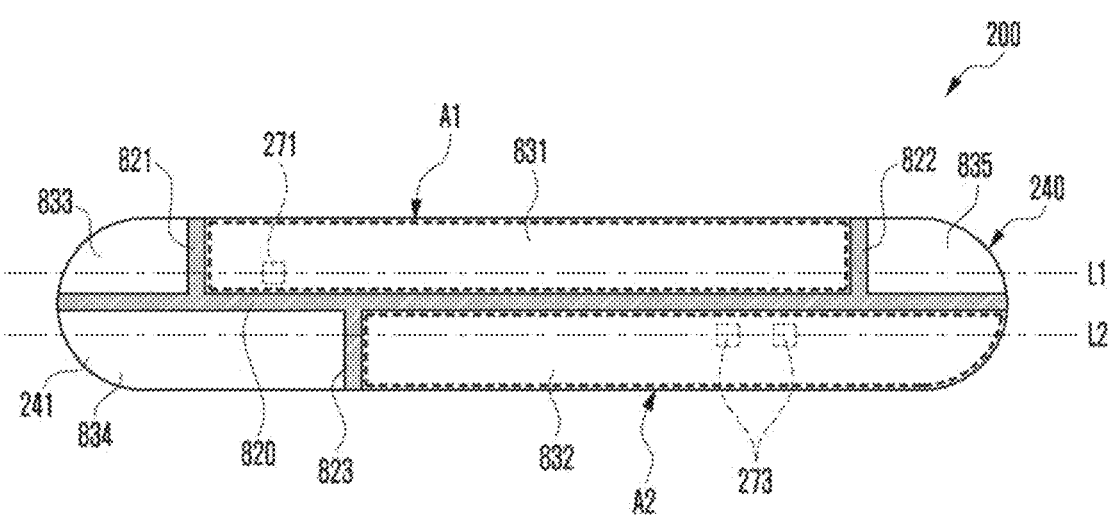
Figure 8C:
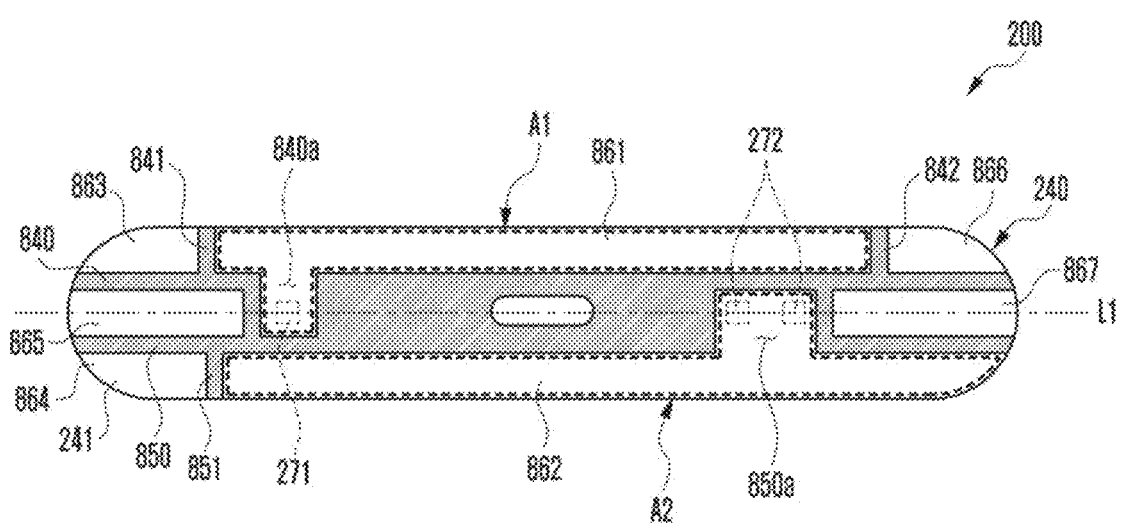
Figure 9A:
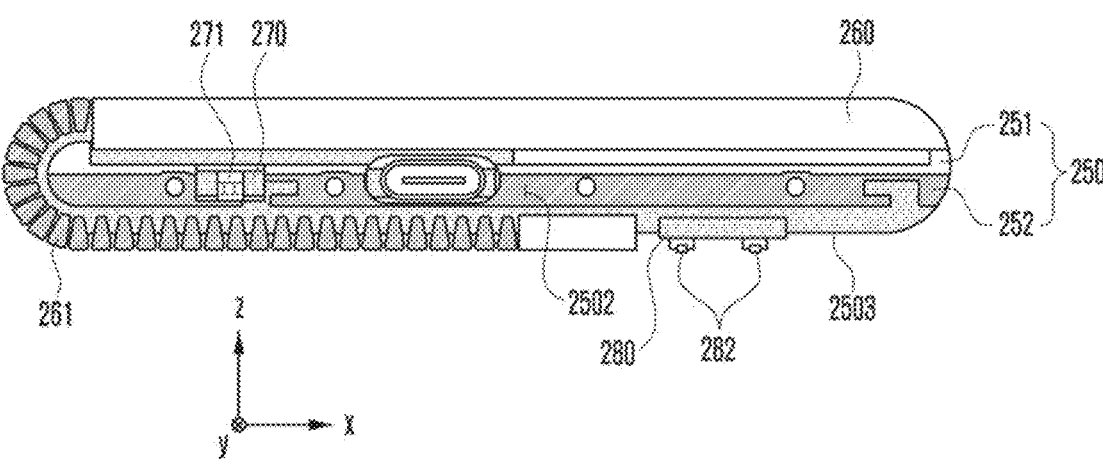
Figure 9B:
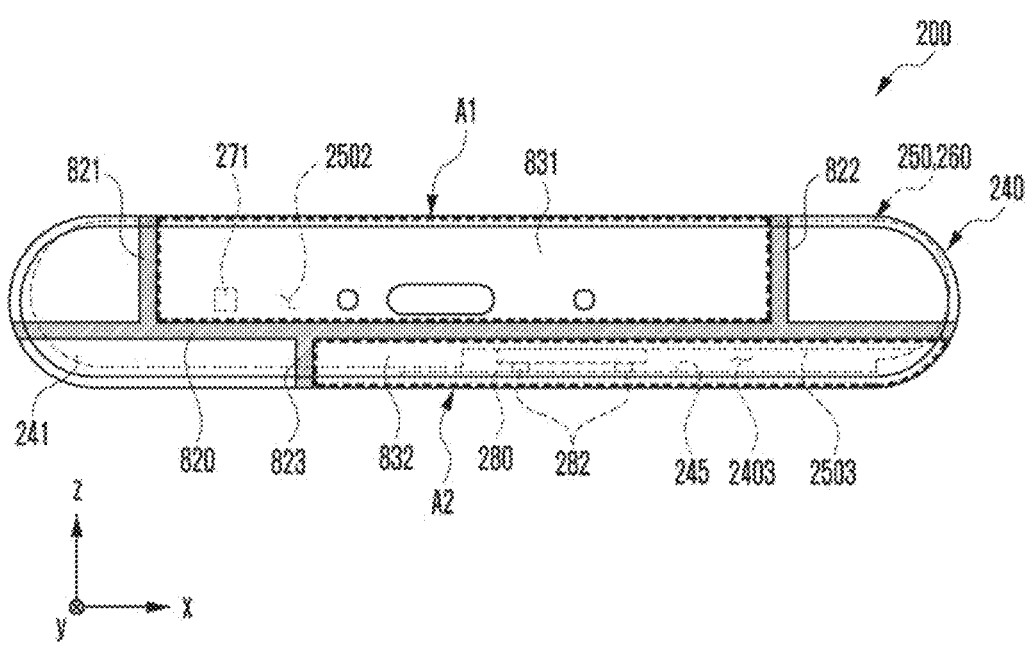
Figure 10A:
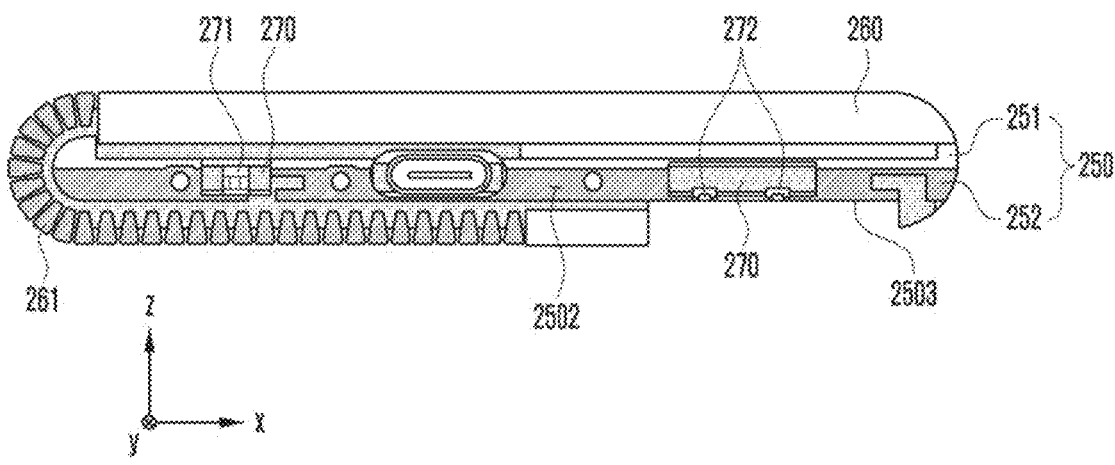
Figure 10B:
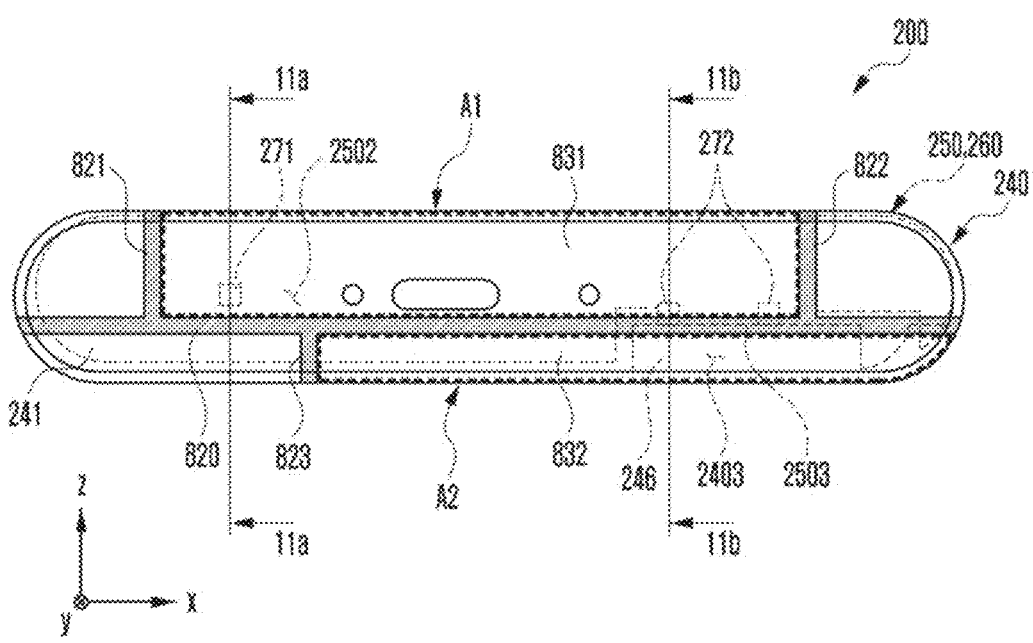
Figure 11D:
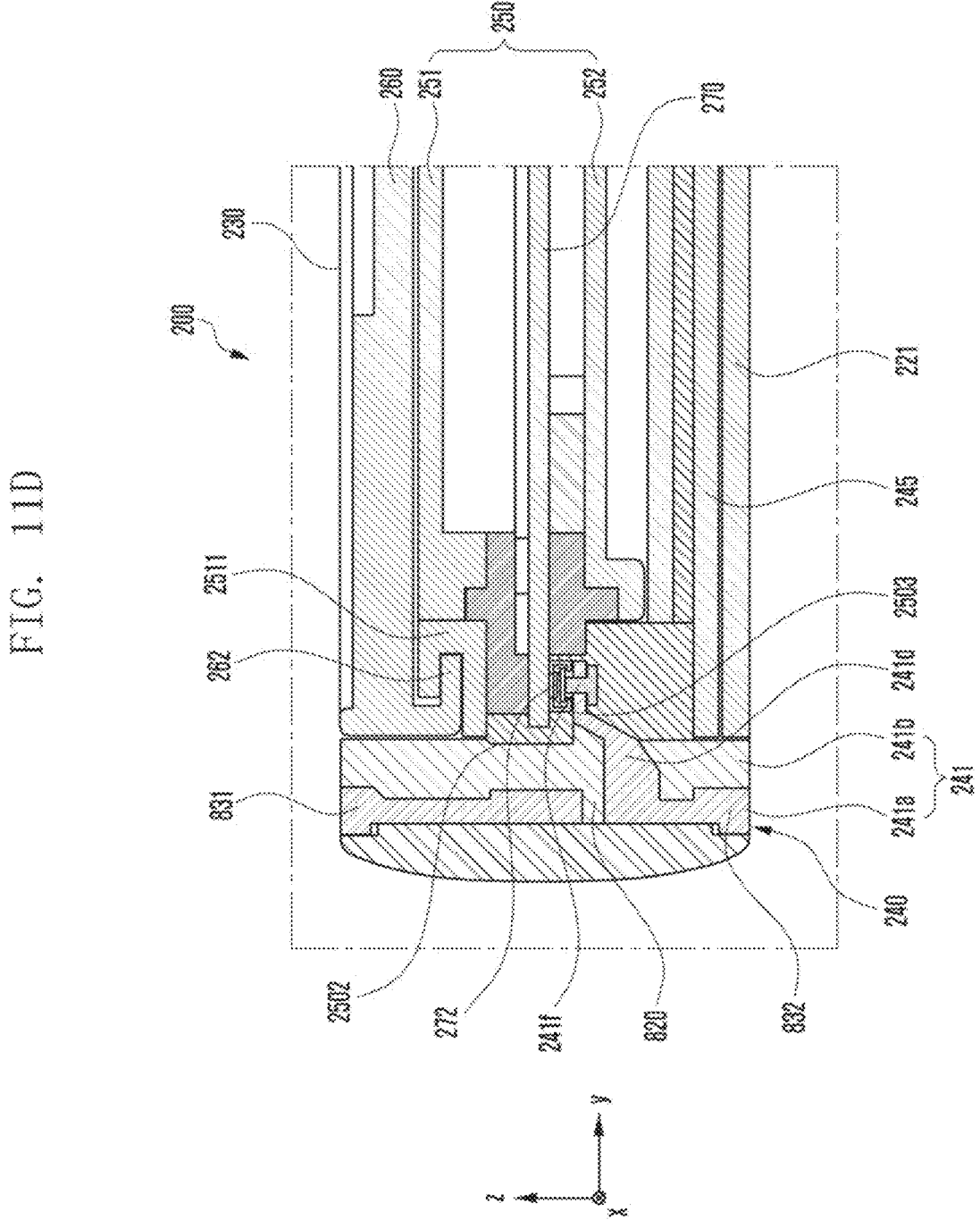
Figure 12A:
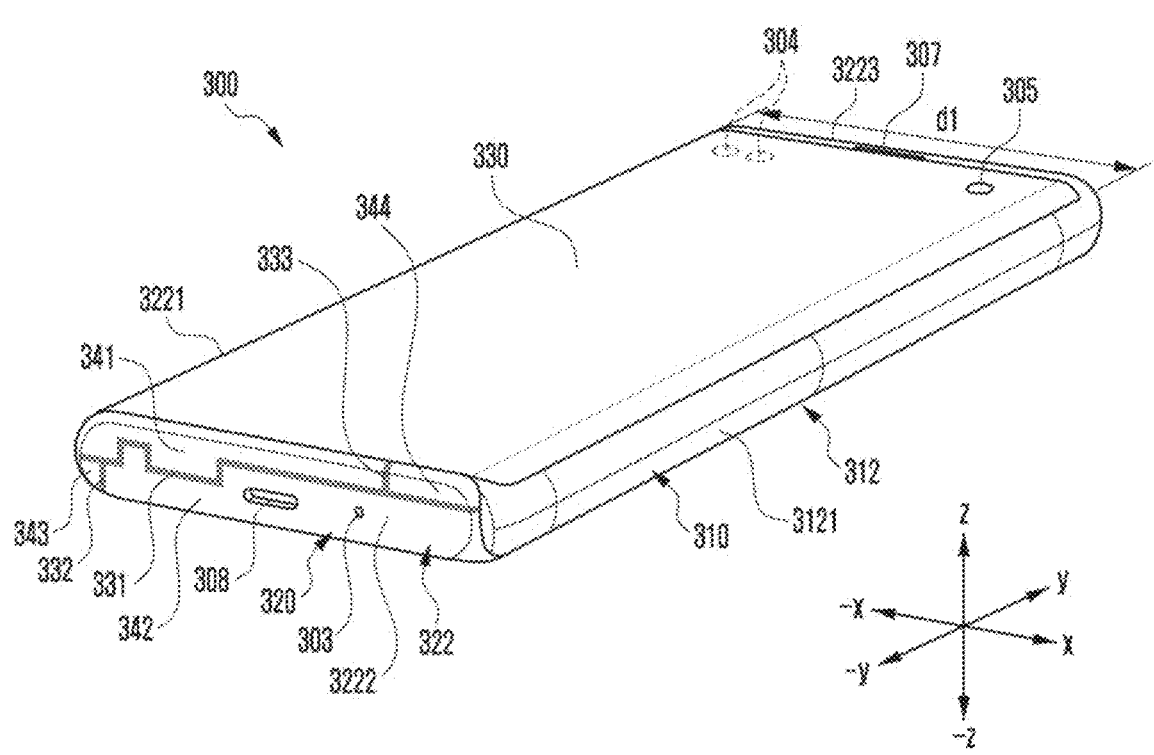
Figure 13A:
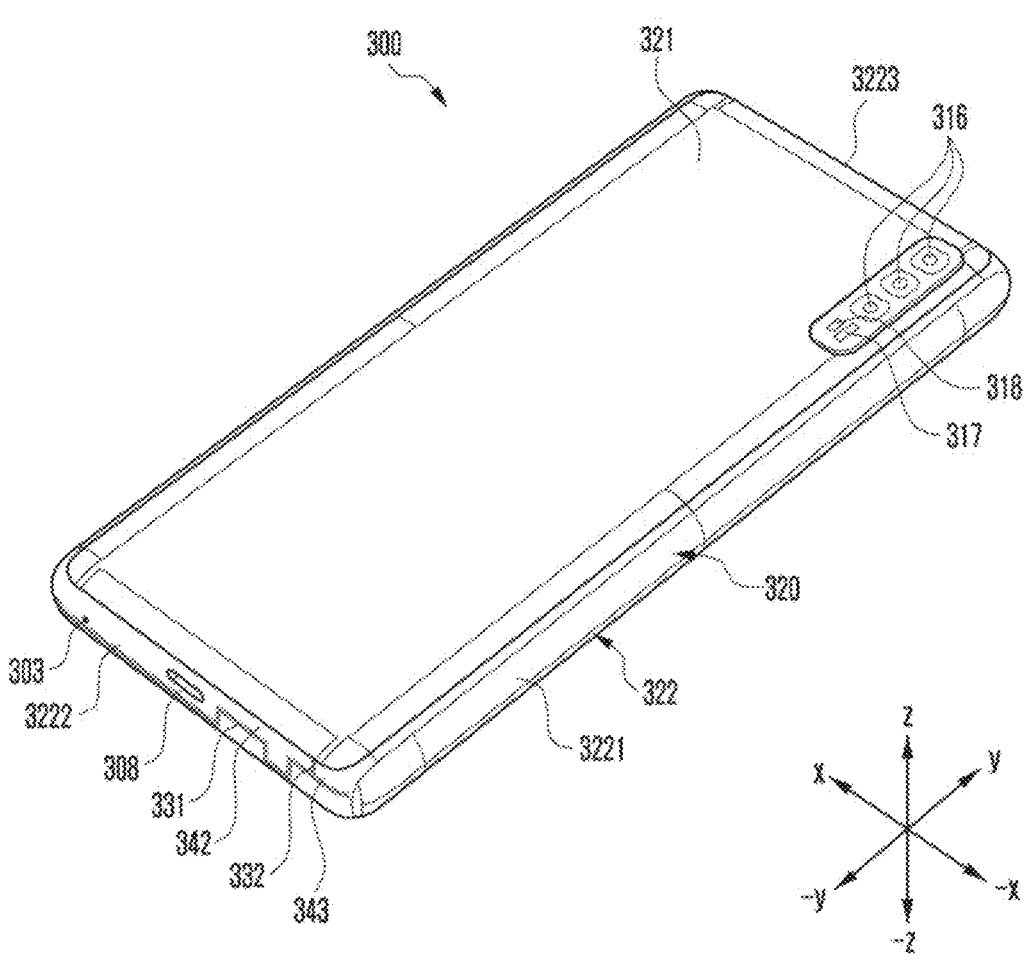
Figure 14A:
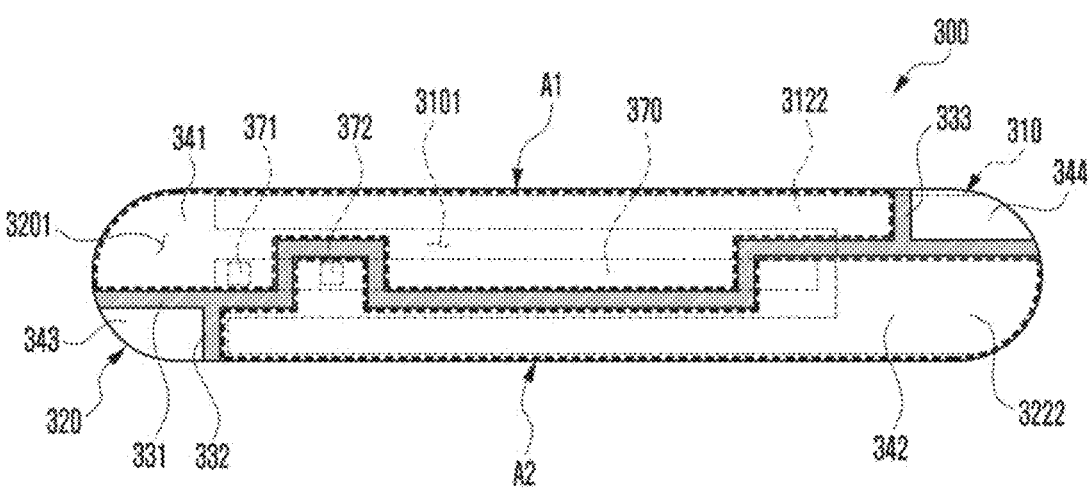
Figure 14B:
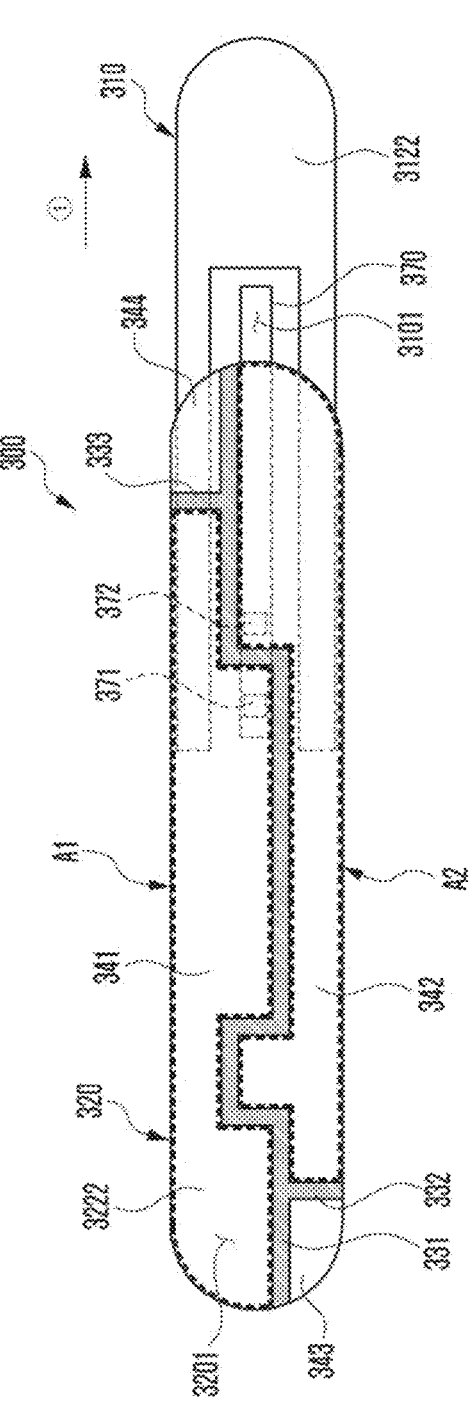

FIG. 1 is a block diagram of an electronic device in a network environment according to various embodiments of the disclosure;

FIG. 2A and FIG. 2B are front perspective views showing a drawn-in state and a drawn-out state of an electronic device according to various embodiments of the disclosure;

Figure 3B:
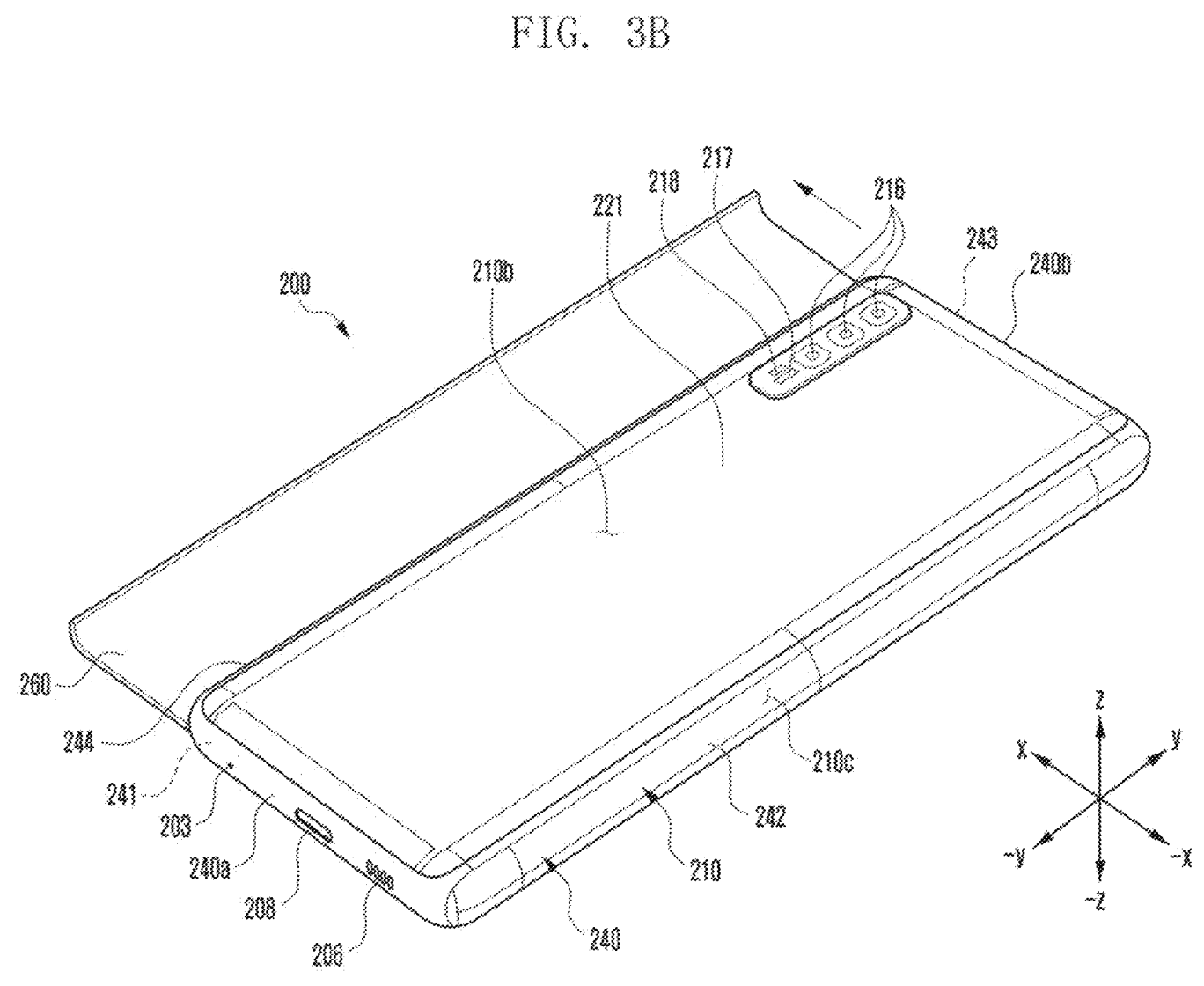

FIG. 3A and FIG. 3B are front perspective views showing a drawn-in state and a drawn-out state of an electronic device according to various embodiments of the disclosure;

FIG. 4 is an exploded perspective view of an electronic device according to various embodiments of the disclosure;

FIG. 5A and FIG. 5B are views illustrating a coupling structure between a bracket housing and a slide plate according to various embodiments of the disclosure;

Figure 6B:
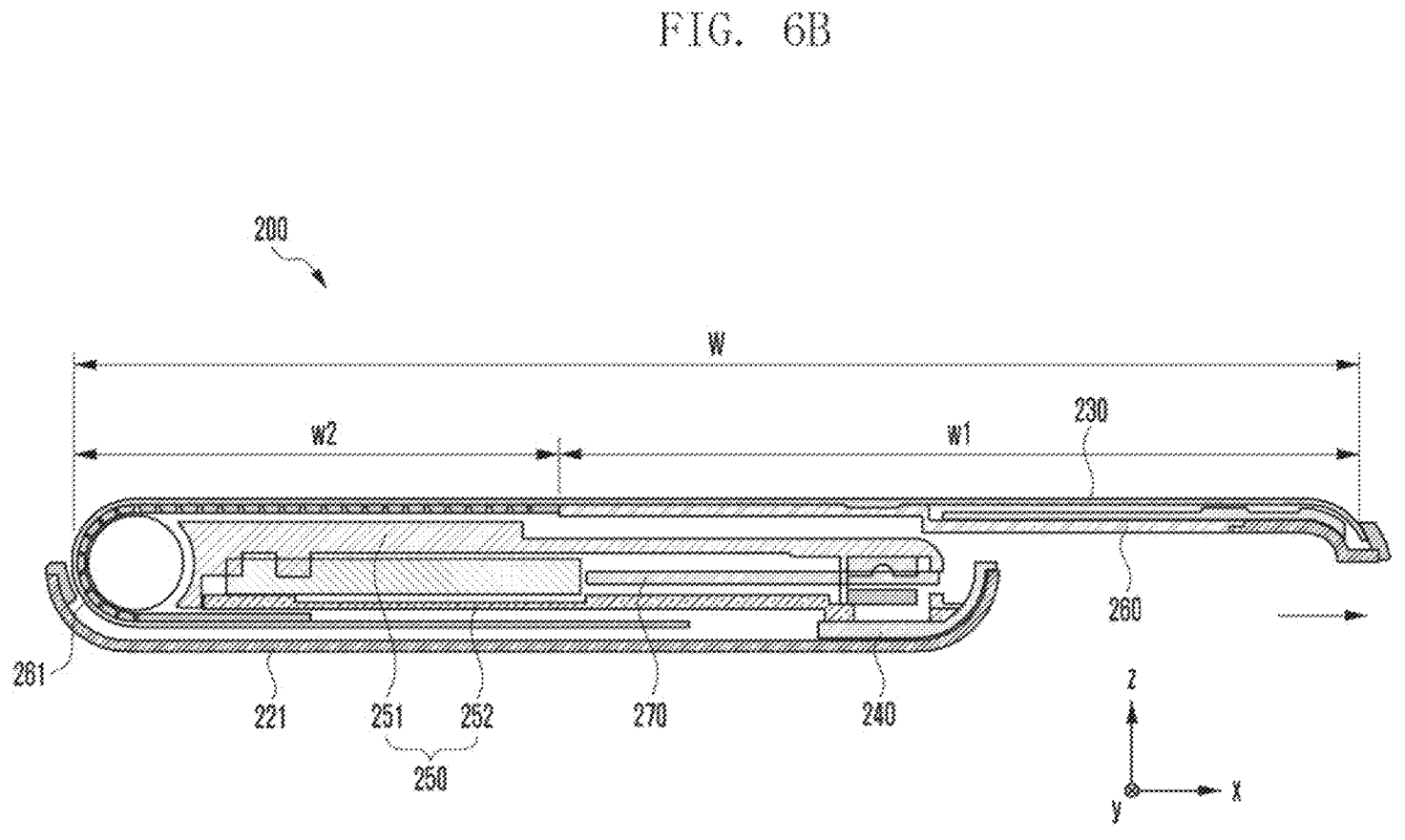

FIG. 6A is a cross-sectional view of an electronic device seen from line 6a-6a in FIG. 2A according to various embodiments of the disclosure;

FIG. 6B is a cross-sectional view of an electronic device seen from line 6b-6b in FIG. 2B according to various embodiments of the disclosure;

FIG. 7A is a view showing a bracket housing in which connection terminals are exposed to a side surface according to various embodiments of the disclosure;

FIG. 7B is a configuration view of an electronic device, which shows a state in which multiple conductive portions formed on a first side surface of a housing are electrically connected to the connection terminals in FIG. 7A according to various embodiments of the disclosure;

FIG. 7C is a configuration view of an electronic device including multiple conductive portions arranged to avoid an additional structure disposed on a side surface of a housing according to various embodiments of the disclosure;

FIGS. 8A, 8B, and 8C are configuration views of an electronic device including conductive portions arranged in various shapes through a shape change of non-conductive portions according to various embodiments of the disclosure;

FIG. 9A is a view showing a bracket housing in which a connection terminal is exposed to a bracket rear surface according to various embodiments of the disclosure;

FIG. 9B is a configuration view of an electronic device, which shows a state in which multiple conductive portions formed on a first side surface of a housing are electrically connected to the connection terminals in FIG. 9A according to various embodiments of the disclosure;

Figure 10C:
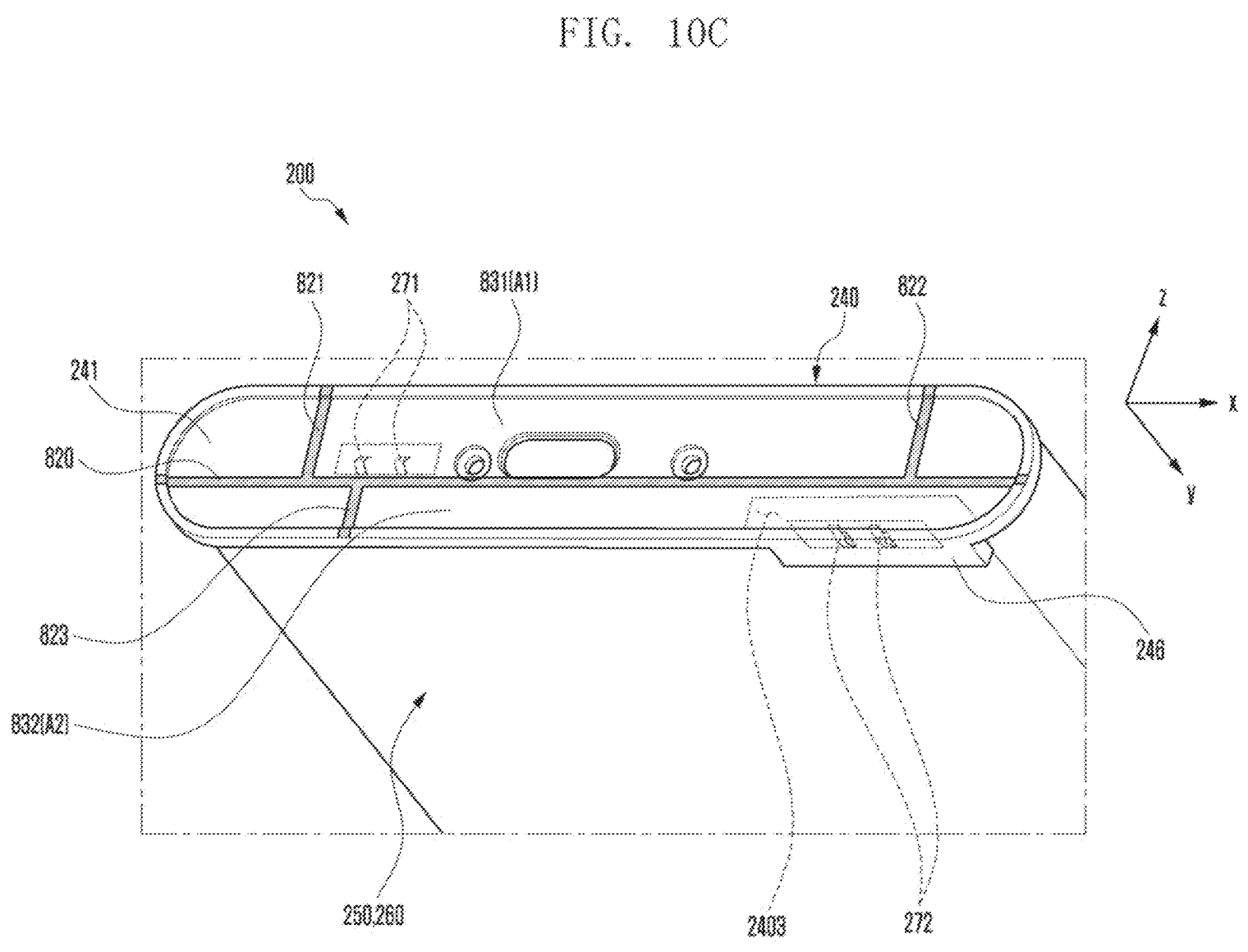

FIG. 10A is a view showing a bracket housing in which a connection terminal is exposed to a bracket rear surface according to various embodiments of the disclosure;

FIG. 10B and FIG. 10C are configuration views of an electronic device, which shows a state in which multiple conductive portions formed on a first side surface of a housing are electrically connected to the connection terminals in FIG. 10A according to various embodiments of the disclosure;

Figure 11A:
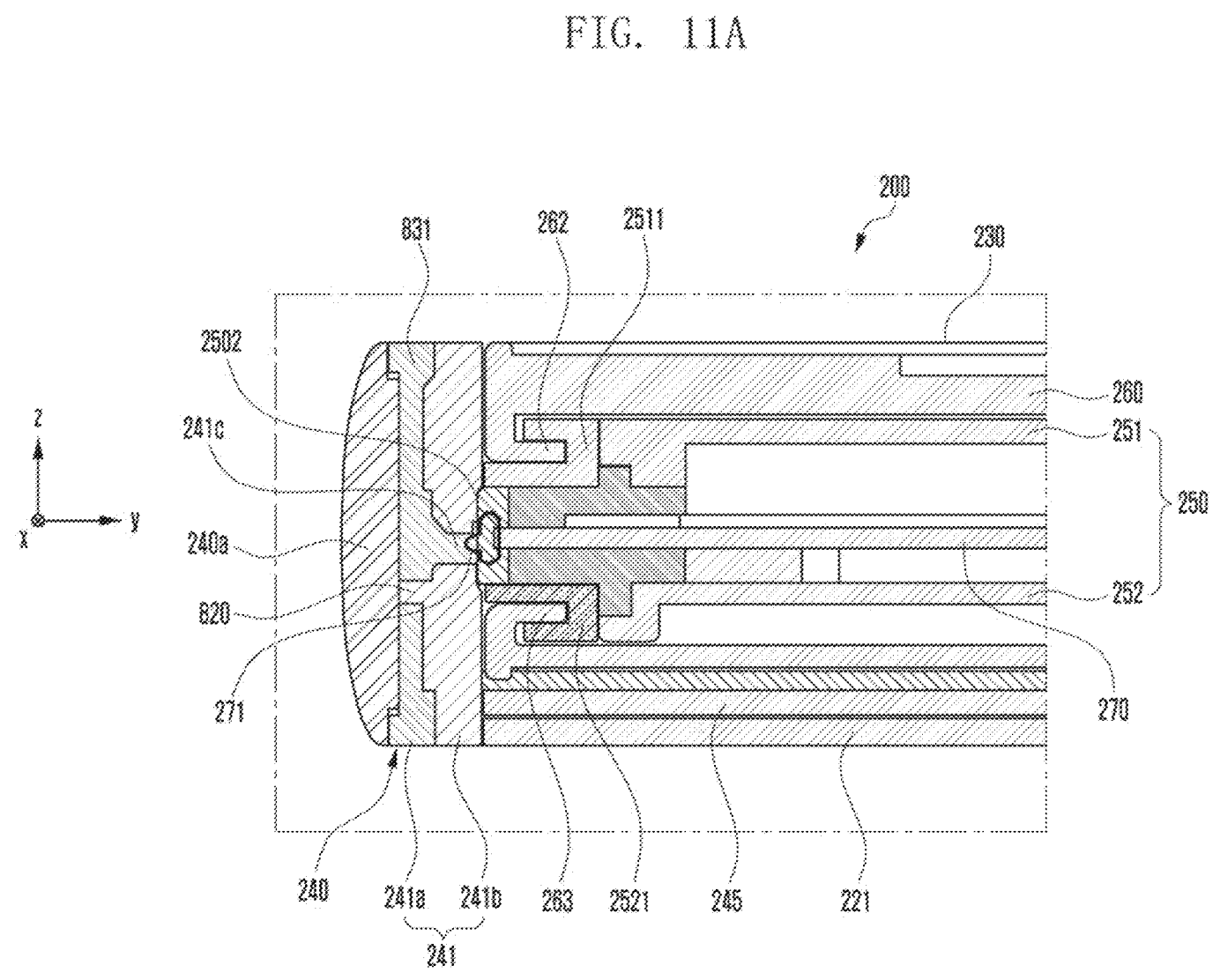
Figure 11B:
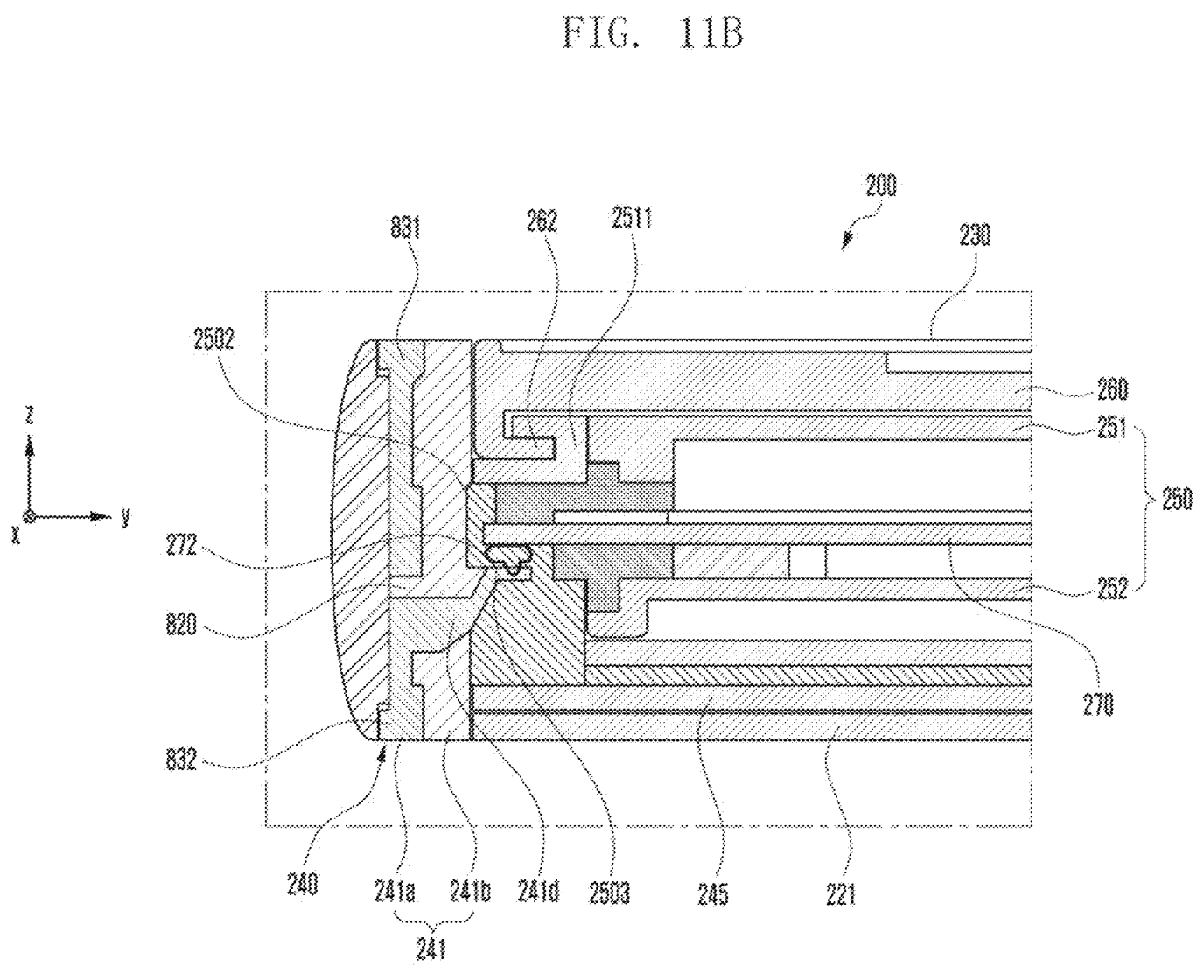
Figure 11C:
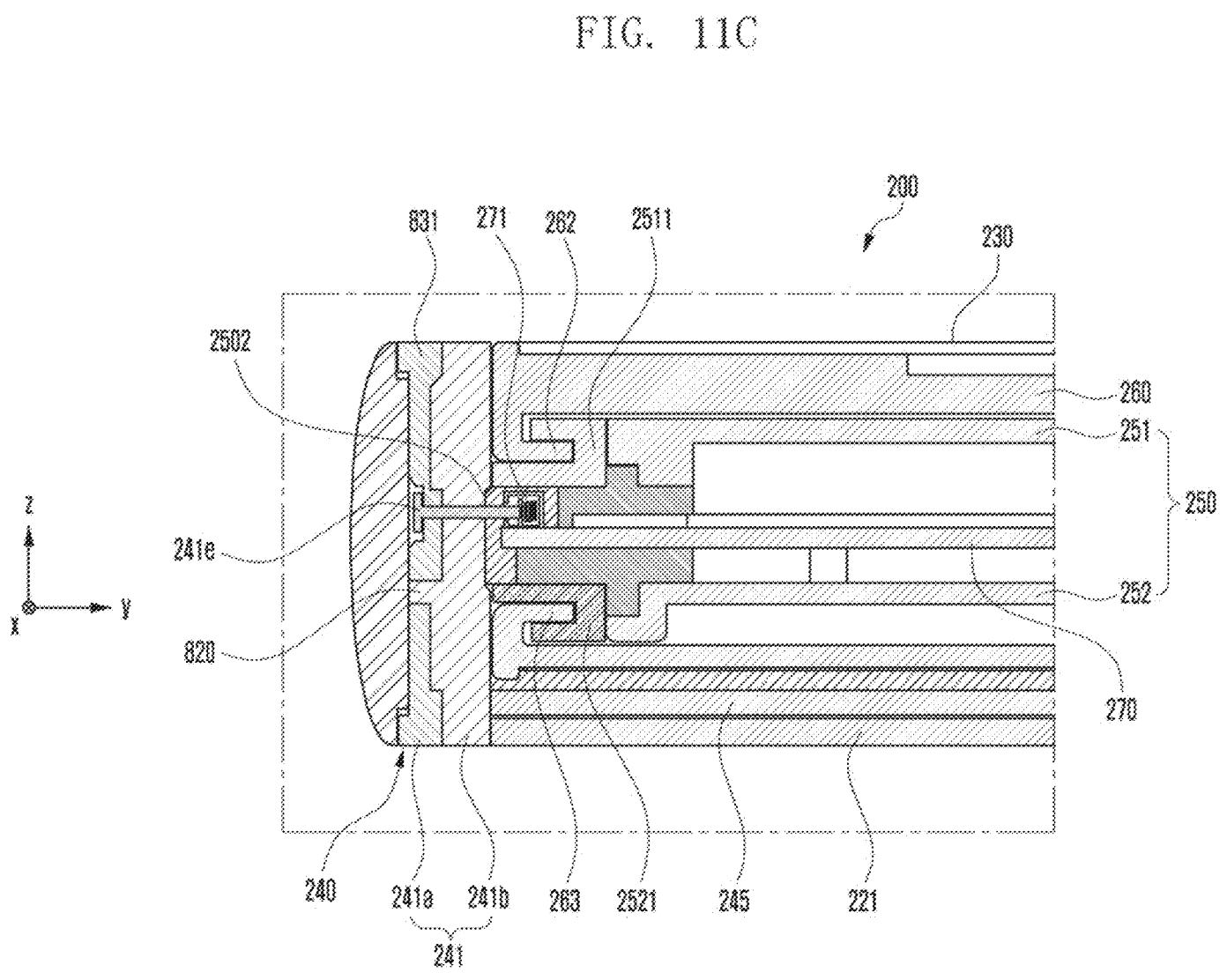

FIG. 11A is a partial cross-sectional view of an electronic device seen along line 11a-11a in FIG. 10B according to various embodiments of the disclosure;

FIG. 11B is a partial cross-sectional view of an electronic device seen along line 11b-11b in FIG. 10B according to various embodiments of the disclosure;

FIG. 11C and FIG. 11D are partial cross-sectional views of an electronic device, which illustrate a state in which a connection terminal and a conductive portion of a first side surface are electrically connected according to various embodiments of the disclosure;

Figure 12B:
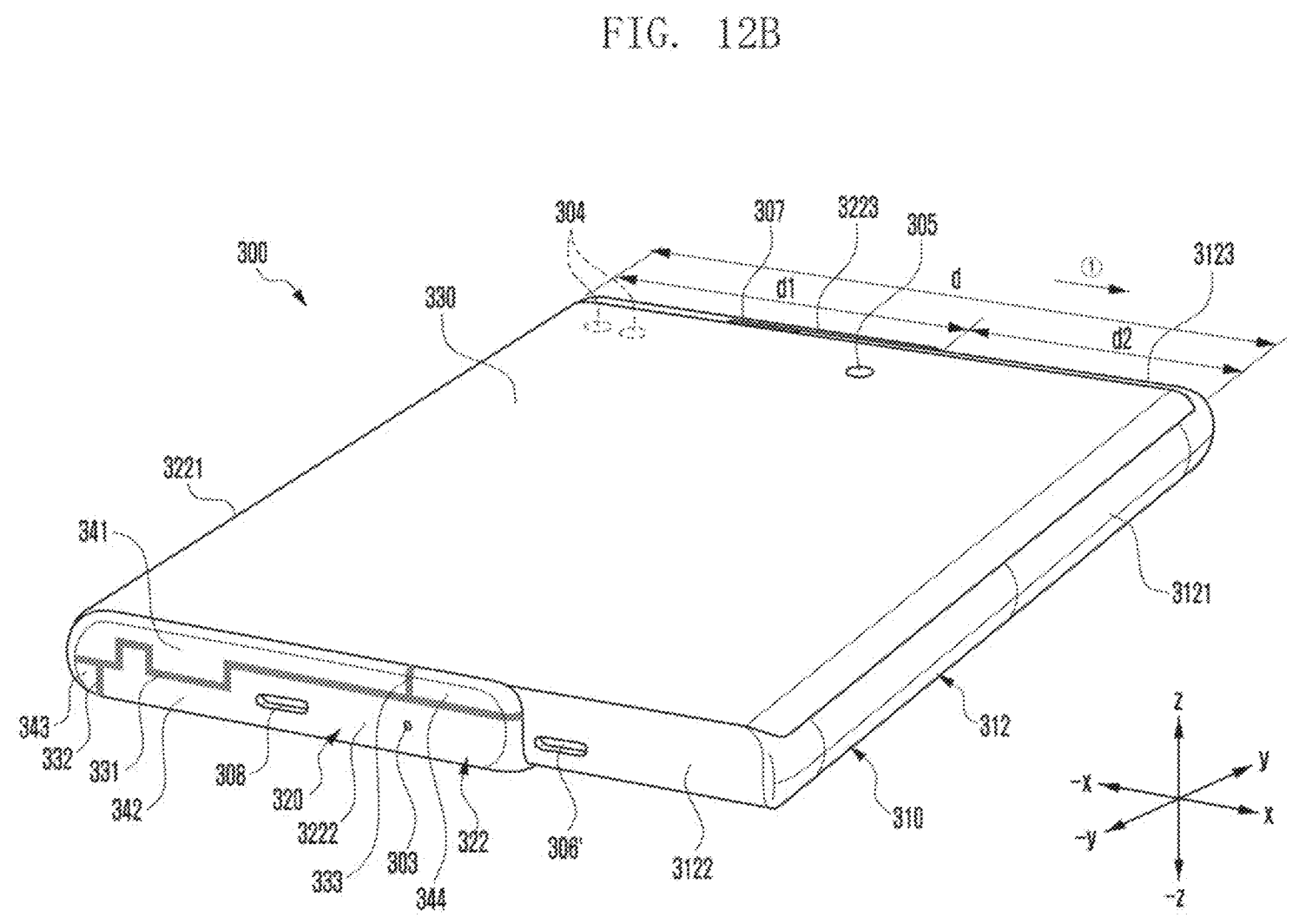

FIG. 12A and FIG. 12B are front perspective views showing a drawn-in state and a drawn-out state of an electronic device according to various embodiments of the disclosure;

Figure 13B:
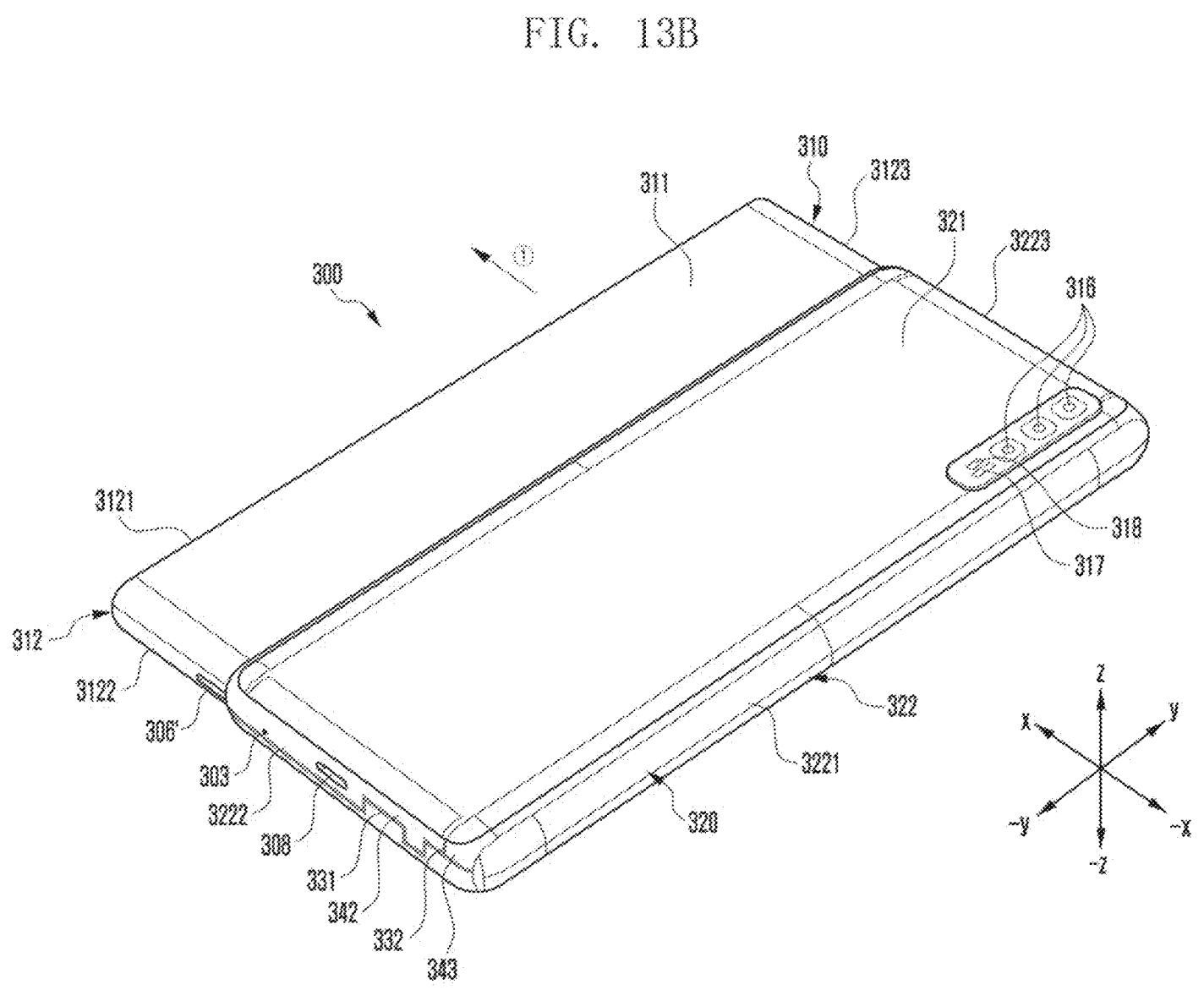

FIG. 13A and FIG. 13B are rear perspective views showing a drawn-in state and a drawn-out state of an electronic device according to various embodiments of the disclosure; and FIG. 14A and FIG. 14B are schematic views showing an electrical connection structure between connection terminals and a conductive side surface in case that an electronic device is in a drawn-in state and a drawn-out state according to various embodiments of the disclosure.

DETAILED DESCRIPTION

FIG. 1 illustrates an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identity module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 or external memory 138.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The audio output device 155 may output sound signals to the outside of the electronic device 101. The audio output device 155 may include, for example, a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or a standard of the Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a PCB). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device according to an embodiment may be one of various types of electronic devices. The electronic device may include a portable communication device (e.g., a smart phone), a computer device, a portable multimedia device, a portable medical device, a camera, a wearable device, or a home appliance. However, the electronic device is not limited to any of those described above.

Various embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. A singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). If an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

The term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

FIG. 2A and FIG. 2B are front perspective views showing a drawn-in state and a drawn-out state of an electronic device 200 according to various embodiments of the disclosure. FIG. 3A and FIG. 3B are rear perspective views showing a drawn-in state and a drawn-out state of an electronic device 200 according to various embodiments of the disclosure.

An electronic device 200 in FIG. 2A may be at least partially similar to the electronic device 101 in FIG. 1, and other embodiments of an electronic device may be included therein.

Referring to FIGS. 2A, 2B, 3A, and 3B, the electronic device 200 may include a housing 240 (e.g., a side frame) and a slide plate 260 which is at least partially movably coupled to the housing 240 and supports at least a part of a flexible display 230. According to one embodiment, the slide plate 260 may include a bendable hinge rail (e.g., the hinge rail 261 in FIG. 4) coupled to the end thereof. For example, in case that the slide plate 260 performs a sliding operation in the housing 240, the hinge rail (e.g., the hinge rail 261 in FIG. 4) may be inserted into an inner space (e.g., the inner space 2403 in FIG. 4) of the housing 240 while supporting the flexible display 230. According to one embodiment, the electronic device 200 may include a front surface 210a (e.g., a first surface) oriented, e.g., disposed, in a first direction (e.g., the Z-axis direction), a rear surface 210b (e.g., a second surface) oriented, e.g., disposed, in a second direction (the −Z-axis direction) opposite to the first direction, and a housing structure 210 including a side surface 210c which surrounds a space between the front surface 210a and the rear surface 210b and is at least partially exposed to the outside. According to one embodiment, the rear surface 210b may be formed through a rear cover 221 coupled to the housing 240. In an embodiment, the rear cover 221 may be formed of polymer, coated or colored glass, ceramic, metal (e.g., aluminum, stainless steel (STS), or magnesium), or a combination of at least two of the above-materials. In some embodiments, the rear surface 221 may be formed integrally with the housing 240. According to one embodiment, at least a part of the side surface 210c may be disposed to be exposed to the outside through the housing 240.

According to various embodiments, the housing 240 may include a first side surface 241 having a first length, a second side surface 242 extending from the first side surface 241 in a direction perpendicular to the first side surface and having a second length longer than the first length, a third side surface 243 extending from the second side surface 242 to be parallel to the first side surface 241 and having the first length, and a fourth side surface 244 extending from the third side surface 243 to be parallel to the second side surface 242 and having the second length. According to one embodiment, the slide plate 260 may support the flexible display 230, may be withdrawn from the second side surface 242 in the direction (e.g., the X-axis direction) of the fourth side surface 244 so as to expand a display area of the flexible display 230, and may be inserted from the fourth side surface 244 in the direction (e.g., the −X-axis direction) of the second side surface 242 so as to reduce the display area of the flexible display 230. According to one embodiment, the electronic device 200 may include a first side cover 240a and a second side cover 240b for covering the first side surface 241 and the third side surface 243. According to one embodiment, the first side surface 241 and the third side surface 243 may be disposed so as not to be exposed to the outside through the first side cover 240a and the second side cover 240b.

According to various embodiments, the electronic device 200 may include a flexible display 230 disposed to be supported by the slide plate 260. According to one embodiment, the flexible display 230 may include a flat surface part (e.g., the flat surface part 231 in FIG. 4) supported by the slide plate 260 and a bendable part (e.g., the bendable part 232 in FIG. 4) extending from the flat surface part 231 and supported by the hinge rail 261. According to one embodiment, the bendable part 232 of the flexible display 230 may be inserted into an inner space (e.g., the inner space 2403 in FIG. 4) of the housing 210 and may be disposed so as not to be exposed to the outside in case that the electronic device 200 is in a drawn-in state (a slide-in state) (e.g., the state where the slide plate 260 is inserted into the housing 240), and may extend from the flat surface part 231 and thus be exposed to the outside while being supported by the hinge rail 261 in case that the electronic device 200 is in a drawn-out state (a slide-out state) (e.g., the state where the slide plate 260 is withdrawn from the housing 240). Therefore, the electronic device 200 may include a rollable type electronic device in which the area of the display screen of the flexible display 230 is changed according to the movement of the slide plate 260 from the housing 200.

According to various embodiments, the slide plate 260 may be movably coupled in a sliding manner to be at least partially inserted into or withdrawn from the housing 240. For example, the electronic device 200 may be configured to have a first width w1 from the second side surface 242 to the fourth side surface 244 in a drawn-in state. According to one embodiment, in a drawn-out state, the electronic device 200 may be configured to have a second width w which is greater than the first width w1 and includes a width w2 in which the hinge rail 261 inserted inside the housing 240 is moved to the outside of the electronic device.

According to various embodiments, the slide plate 260 may be operated by manipulation of a user. In some embodiments, the slide plate 260 may be automatically operated by a driving mechanism disposed in an inner space (e.g., the inner space 2403 in FIG. 4) of the housing 240. According to one embodiment, the electronic device 200 may be configured to control the operation of the slide plate 260 by a driving mechanism through a processor (e.g., the processor 120 in FIG. 1) in case that an event for an open/close state switching of the electronic device 200 is detected. In some embodiments, a processor (e.g., the processor 120 in FIG. 1) of the electronic device 200 may be configured to display an object in various ways and also to control so as to execute an application program, in response to a changed display area of the flexible display 230 according to a drawn-out state, a drawn-in state, or an intermediate state of the slide plate 260.

According to various embodiments, the electronic device 200 may include at least one of an input device 203, sound output devices 206 and 207, sensor modules 204 and 217, camera modules 205 and 216, a connector port 208, a key input device (not shown), or an indicator (not shown). As another embodiment, at least one of the elements described above may be omitted from the electronic device 200, or other elements may be additionally included therein.

According to various embodiments, the input device 203 may include a microphone 203. In some embodiments, the input device 203 may also include multiple microphones 203 arranged to sense the direction of sound. The sound output devices 206 and 207 may include speakers 206 and 207. The speakers 206 and 207 may include an external speaker 206 and a receiver 207 for phone calls. As another embodiment, the sound output devices 206 and 207 may also include a speaker (e.g., a piezo speaker) which is operated while a separate hole 206 is excluded.

According to various embodiments, the sensor modules 204 and 217 may generate an electrical signal or a data value corresponding to an internal operation state of the electronic device 200 or an external environmental state. For example, the sensor modules 204 and 217 may include a first sensor module 204 (e.g., a proximity sensor or an illuminance sensor) disposed on the front surface of an electronic device, and/or a second sensor module 217 (e.g., an HRM sensor) disposed on the rear surface thereof. According to one embodiment, the first sensor module 204 may be disposed under the flexible display 230 in the front surface of the electronic device. According to one embodiment, the first sensor module 204 may further include at least one of a proximity sensor, an illuminance sensor 204, a time of flight (TOF) sensor, an ultrasonic sensor, a fingerprint recognition sensor, a gesture sensor, a gyro sensor, a barometric pressure sensor, a magnetic sensor, an acceleration sensor, a grip sensor, a color sensor, an infrared (IR) sensor, a biometric sensor, a temperature sensor, or a humidity sensor.

According to various embodiments, the camera devices 205 and 216 may include a first camera device 205 disposed on a front surface of the electronic device 200, and a second camera device 216 disposed on a rear surface thereof. According to one embodiment, the electronic device 200 may include a flash 218 positioned near the second camera device 216. According to one embodiment, the camera devices 205 and 216 each may include one lens or multiple lenses, an image sensor, and/or an image signal processor. According to one embodiment, the first camera device 205 may be disposed under the flexible display 230 and configured to photograph a subject through a part of an active area of the flexible display 230. According to one embodiment, for example, the flash 218 may include a light-emitting diode or a xenon lamp. In some embodiments, two or more lenses (a wide-angle lens and a telephoto lens) and image sensors may be arranged on one surface of the electronic device 200.

According to various embodiments, the electronic device 200 may include at least one antenna (not shown). According to one embodiment, for example, the at least one antenna may wirelessly communicate with an external electronic device (e.g., the electronic device 104 in FIG. 1), or may wirelessly transmit/receive power required for charging. According to one embodiment, the antenna may include a legacy antenna, a mmWave antenna, a near field communication (NFC) antenna, a wireless charging antenna, and/or a magnetic secure transmission (MST) antenna.

According to various embodiments, the housing 240 (e.g., a side frame) may be at least partially formed of a conductive material (e.g., a meta material). According to one embodiment, the housing 240 may have at least the first side surface 241 and/or the third side surface 243 which is formed of a conductive material, is not involved in the driving of the slide plate 260, and is divided into multiple conductive portions electrically insulated through a nonconductive material. According to one embodiment, the multiple conductive portions may be electrically connected to a wireless communication circuit (e.g., the wireless communication module 192 in FIG. 1) disposed inside the electronic device 200, and thus may be used as antennas operating in various frequency bands.

According to various embodiments of the disclosure, a conductive material may be divided into multiple conductive portions through a predetermined process (e.g., an insert injection or a double injection) by using a non-conductive material. For example, the conductive portions may be formed as conductive portions having various shapes and/or numbers by non-conductive portions formed to at least partially cross, through a non-conductive material, and thus may be operated as antennas corresponding to various frequency bands.

FIG. 4 is an exploded perspective view of the electronic device 200 according to various embodiments of the disclosure.

Referring to FIG. 4, the electronic device 200 may include a housing 240 including a first surface 2401, a second surface 2402 oriented in a direction opposite to the first surface 2401, and a side surface (e.g., the side surface 210c in FIG. 2A) surrounding an inner space 2403 between the first surface 2401 and the second surface 2402, a bracket housing 250 disposed to face the first surface 2401 in the inner space 2403 of the housing 240, a slide plate 260 including a hinge rail 261 slidably coupled from the bracket housing 250, a flexible display 230 disposed to be supported by the slide plate 260 and the hinge rail 261, and a rear cover 221 disposed to face the second surface 2402. According to one embodiment, the flexible display 230 may include the flat surface part 231 supported by the slide plate 260 and the bendable part 232 which extends from the flat surface part 231 and is supported by the hinge rail 261. According to one embodiment, the housing 240 may include a support plate 245 at least partially extending from at least one side surface (e.g., the fourth side surface 244) to inner space 2403. According to one embodiment, the support plate 245 may be formed to have a structure for supporting electronic components (e.g., the bracket housing 250) arranged in an inner space of the electronic device 200. In some embodiments, the support surface 245 may also be structurally coupled to the housing 240. According one embodiments, the housing 240 may include the first side surface 241 having a first length, the second side surface 242 extending from the first side surface 241 in a direction perpendicular to the first side surface and having a second length longer than the first length, a third side surface 243 extending from the second side surface 242 to be parallel to the first side surface 241 and having the first length, and a fourth side surface 244 extending from the third side surface 243 to be parallel to the second side surface 242 and having the second length. According to one embodiment, the electronic device 200 may include the first side cover 240a and the second side cover 240b for covering the first side surface 241 and the third side surface 243. According to one embodiment, the first side surface 241 and the third side surface 243 may be disposed so as not to be exposed to the outside through the first side cover 240a and the second side cover 240b. In some embodiments, in a state (e.g., a slide-in state) where the bendable part 232 of the flexible display 230 is inserted into the inner space 2403 of the housing 240, at least a part of the bendable part 232 may be disposed to be visible from the outside through the rear cover 221. In this case, the rear cover 221 may be formed of a transparent material and/or a translucent material.

According to various embodiments, the first side surface 241 may include multiple conductive portions 2413a, 2413b, 2413c, 2413d, and 2413e formed through the first side surface 241 formed of a conductive material. According to one embodiment, the multiple conductive portions 2413a, 2413b, 2413c, 2413d, and 2413e may be divided to be electrically insulated through multiple non-conductive portions 2411, 2412a, 2412b, and 2412c (e.g., a polymer injection molding product). For example, the non-conductive portions 2411, 2412a, 2412b, and 2412c may be arranged to at least partially cross with respect to each other, so as to provide the conductive portions 2413a, 2413b, 2413c, 2413d, and 2413e having various shapes and/or numbers. According to one embodiment, the non-conductive portions 2411, 2412a, 2412b, and 2412c may include a first non-conductive portion 2411 formed along a first direction (the direction ①) and multiple non-conductive portions 2412a, 2412b, and 2412c formed to cross the first non-conductive portion 2411 along a second direction (the direction ②) perpendicular to the first direction (the direction ①). As illustrated, the multiple non-conductive portions 2412a, 2412b, and 2412c may include a second non-conductive portion 2412a, a third non-conductive portion 2412b, and a fourth non-conductive portion 2412c which cross the first non-conductive portion 2411 or meet while crossing the first non-conductive portion 2411. According to one embodiment, the first side surface 241 may include the multiple conductive portions 2413a, 2413b, 2413c, 2413d, and 2413e divided to be electrically insulated through the multiple non-conductive portions 2411, 2412a, 2412b, and 2412c. For example, the multiple conductive portions 2413a, 2413b, 2413c, 2413d, and 2413e may include a first conductive portion 2413a, a second conductive portion 2413b, a third conductive portion 2413c, a fourth conductive portion 2413d, and/or a fifth conductive portion 2413e. According to one embodiment, at least some conductive portions (e.g., the first conductive portion 2413a and the second conductive portion 2413b) of the multiple conductive portions 2413a, 2413b, 2413c, 2413d, and 2413e may be electrically connected to a wireless communication circuit disposed on a substrate (e.g., the substrate 270 in FIG. 5B) disposed in the inner space 2403 of the electronic device 200, and thus may be used as an antenna. According to one embodiment, the multiple non-conductive portions 2411, 2412a, 2412b, and 2412c, which are exposed from the first side surface 241, may be covered so as not to be seen from the outside through the first side cover 240a, and thus it may help to form the electronic device 200 having a beautiful appearance. Although not illustrated, the third side surface 243 may have the multiple conductive portions 2413a, 2413b, 2413c, 2413d, and 2413e formed in substantially the same manner as that of the first side surface 241. In some embodiments, the first non-conductive portion 241 and the multiple non-conductive portions 2412a, 2412b, and 2412c cross each other while forming various angles other than the right angle.

FIG. 5A and FIG. 5B are views illustrating a coupling structure between the bracket housing 250 and the slide plate 260 according to various embodiments of the disclosure.

Referring to FIG. 5A and FIG. 5B, the slide plate 260 and the hinge rail 261 may be arranged in a manner of surrounding at least a part of the bracket housing 250 in an inner space (e.g., the inner space 2403 in FIG. 4) of the electronic device 200. According to one embodiment, the bracket housing 250 may include a first bracket 251 facing a flexible display (e.g., the flexible display 230 in FIG. 4) and a second bracket 252 which is coupled to the first bracket 251 and faces a rear cover (e.g., the rear cover 221 in FIG. 4). According to one embodiment, the bracket housing 250 may include a substrate 270 disposed in a space 2501 formed through the coupling between the first bracket 251 and the second bracket 252. According to one embodiment, the first bracket 251 may include a first guide rail 2511. According to one embodiment, the second bracket 252 may include a second guide rail 2521. According to one embodiment, the slide plate 260 may include a third guide rail 262 coupled to the first guide rail 2511. According to one embodiment, the hinge rail 261, which is coupled to one end of the slide plate 260, may include a fourth guide rail 263 coupled to the second guide rail 2521. According to one embodiment, the slide plate 260 may be slidably disposed with reference to the bracket housing 250 since the third guide rail 262 is slidably coupled to the first guide rail 2511 of the first bracket 251, and the fourth guide rail 263 of the hinge rail 261 is slidably coupled to the second guide rail 2521 of the second bracket 252. In some embodiments, the coupling structure of the above-described guide rails 2511, 2521, 262, and 263 may be further arranged in other positions of the slide plate 260 and the bracket housing 250 in order to induce stable coupling and operation of the slide plate 260.

FIG. 6A is a cross-sectional view of the electronic device 200 seen from line 6a-6a in FIG. 2A according to various embodiments of the disclosure. FIG. 6B is a cross-sectional view of the electronic device 200 seen from line 6b-6b in FIG. 2B according to various embodiments of the disclosure.

Referring to FIG. 6A and FIG. 6B, the electronic device 200 may include the slide plate 260 including a hinge rail 261 which is slidably disposed with reference to the bracket housing 250 fixed to an inner space (e.g., the inner space 2403 in FIG. 4) of a housing (e.g., the housing 240 in FIG. 4), and the flexible display 230 disposed to be supported by the slide plate 260 and the hinge rail 261. According to one embodiment, the flexible display 230 may include a flat surface part (e.g., the flat surface part 231 in FIG. 4) supported by a slide plate 260 and a bendable part (e.g., the bendable part 232 in FIG. 4) extending from the flat surface part 231 and supported by the hinge rail 261. According to one embodiment, the bendable part 232 of the flexible display 230 may be inserted into an inner space (e.g., the inner space 2403 in FIG. 4) of the housing 210 in case that the electronic device 200 is in a drawn-in state (e.g., the state where the slide plate 260 is inserted into the housing 240) (a slide-in state), and may extend from the flat surface part 231 and thus be exposed to the outside while being supported by the hinge rail 261 in case that the electronic device 200 is in a drawn-out state (e.g., the state where the slide plate 260 is withdrawn from the housing 240) (a slide-out state). There-fore, the electronic device 200 may be configured such that the area of a display screen of the flexible display 230 is changed according to the movement of the slide plate 260 from the housing 200. In some embodiments, in a state (e.g., a slide-in state) where the bendable part 232 of the flexible display 230 is inserted into the inner space 2403 of the housing 240, at least a part of the bendable part 232 may be disposed to be visible from the outside through the rear cover 221.

According to various embodiments, the slide plate 260 may be movably coupled in a sliding manner to be at least partially inserted into or withdrawn from the housing 240. For example, the electronic device 200 may be configured to have the first width w1 from the second side surface 242 to the fourth side surface 244 in the drawn-in state of FIG. 6A. Therefore, in a drawn-in state, the electronic device 200 may have a display area of a first size through the flexible display 230. According to one embodiment, in a drawn-out state, the electronic device 200 may be configured to have the second width w which is greater than the first width w1 and includes a width w2 in which the hinge rail 261 inserted inside the housing 240 is moved to the outside of the electronic device 200 together with a bendable part (e.g., the bendable part 232 in FIG. 4). Therefore, in a drawn-out state, the electronic device 200 may have a display area of a second size greater than the first size, through the flexible display 230.

FIG. 7A is a view showing the bracket housing 250 in which connection terminals 271 and 272 are exposed to a side surface 2502 according to various embodiments of the disclosure. FIG. 7B is a configuration view of the electronic device 200, which shows a state in which multiple conduc-tive portions 2413a and 2413b formed on the first side surface 241 of the housing 240 are electrically connected to the connection terminals 271 and 272 in FIG. 7A according to various embodiments of the disclosure.

Referring to FIG. 7A, an electronic device (e.g., the electronic device 200 in FIG. 4) may include the substrate 270 disposed in an inner space (e.g., the inner space 2501 in FIG. 5B) of the bracket housing 250, and at least one connection terminal 271 or 272 disposed on the substrate 270. According to one embodiment, at least one connection terminal 271 or 272 may be disposed to be exposed through a bracket side surface 2502 of the bracket housing 250 in a state where the slide plate 260 is coupled thereto. According to one embodiment, the at least one connection terminal 271 or 272 may include a C-clip, a pogo pin, a conductive tape, or an FPCB having a conductive terminal exposed there-from, which is exposed from the substrate 270 to the bracket side surface 2502. According to one embodiment, the at least one connection terminal 271 or 272 may be electrically connected to a wireless communication circuit (e.g., the wireless communication module 192 in FIG. 1) disposed on the substrate 270. According to one embodiment, the at least one connection terminal 271 or 272 may be disposed in an area avoiding an additional structure (e.g., the screw holes 2416 and/or the connector port 2415) disposed on the first side surface 241 in case that the bracket side surface 2502 of the bracket housing 250 faces the first side surface 241 of the housing 240. According to one embodiment, the at least one connection terminal 271 or 272 may be exposed through the bracket side surface 2502 of the bracket housing 250, and thus may include a first connection terminal 271 which is formed on the first side surface 241 of the bracket housing 250 and physically and electrically connected to the first conductive portion 2413a operating as a first antenna A1. According to one embodiment, the at least one connection terminal 271 or 272 may be exposed through the bracket side surface 2502 of the bracket housing 250, and thus may include a first connection terminal 272 which is formed on the first side surface 241 of the housing 240 and physically and electrically connected to the second conductive portion 2413b operating as a second antenna A2.

Referring to FIG. 7B, the electronic device 200 may include the housing 240 including the first side surface 241. According to one embodiment, the first side surface 241 may include the multiple conductive portions 2413a, 2413b, 2413c, 2413d, and 2413e divided to be electrically insulated through the multiple non-conductive portions 2411, 2412a, 2412b, and 2412c. According to one embodiment, the mul-tiple non-conductive portions 2412a, 2412b, and 2412c may include the second non-conductive portion 2412a, the third non-conductive portion 2412b, and the fourth non-conduc-tive portion 2412c which cross the first non-conductive portion 2411 or meet while crossing the first non-conductive portion 2411. According to one embodiment, the multiple conductive portions 2413a, 2413b, 2413c, 2413d, and 2413e may include the first conductive portion 2413a, the second conductive portion 2413b, the third conductive portion 2413c, the fourth conductive portion 2413d, and/or the fifth conductive portion 2413e. According to one embodiment, the first non-conductive portion 2411 may be formed along the width direction (e.g., the direction ① of FIG. 4) of the electronic device 200. According to one embodiment, the second non-conductive portion 2412a, the third non-conductive portion 2412b, and the fourth non-conductive portion 2412c may be arranged in a manner of crossing the first non-conductive portion 2411 in a direction perpendicular to an imaginary line L1. According to one embodiment, the multiple non-conductive portions 2411, 2412a, 2412b, and 2412c have be arranged to avoid an additional structure (e.g., the screw hole 2416 and/or the connector port 2415) disposed on the first side surface 241.

According to various embodiments, the bracket housing 250, which is disposed in an inner space (e.g., the inner space 2403 in FIG. 4) of the electronic device 200, may be disposed such that the bracket side surface 2502 faces the first side surface 241 of the housing 240. In this case, the at least one connection terminal 271 or 272 may be disposed to be in contact with the first side surface 241. According to one embodiment, the first connection terminal 271 may be in electrically contact with the first conductive portion 2413a and thus may be disposed to be electrically connected to a substrate (e.g., the substrate 270 in FIG. 7A). According to one embodiment, the second connection terminal 272 may be in electrically contact with the second conductive portion 2413b and thus may be disposed to be electrically connected to the substrate (e.g., the substrate 270 in FIG. 7A). According to one embodiment, on the bracket side surface 2502 having a relatively narrow space, the connection terminals 271 and 272 may be arranged on the imaginary line L1 to be spaced apart from each other at designated intervals. According to one embodiment, as illustrated, although the second connection terminal 272 is induced to be electrically connected to the second conductive portion 2413b through a modified terminal accommodation structure 2411a of at least a part of the first non-conductive portion 2411, it is not limited thereto. For example, in order for the first connection terminal 271 and the second connection terminal 272 to be electrically connected to conductive portions different from each other, respectively, at least a part of the non-conductive portions may have various modified structures for accommodating the connection terminals 271 and 272. In some embodiments, the connection terminals 271 and 272 may be arranged on lines different from each other in case that the bracket side surface 2502 of the bracket housing 250 has a space allowing the connection terminals 271 and 272 to be arranged.

According to various embodiments, a wireless communication circuit (e.g., the wireless communication module 192 in FIG. 1) may be configured to transmit and/or receive a wireless signal in a first frequency band through the first conductive portion 2413a. According to one embodiment, a wireless communication circuit (e.g., the wireless communication module 192 in FIG. 1) may be configured to transmit and/or receive a wireless signal in a second frequency band different from the first frequency band through the second conductive portion 2413b. According to one embodiment, the first frequency band and the second frequency band may be determined in the range of about 600 MHz-6000 MHz (e.g., a legacy band). In some embodiments, in case that more connection terminals are exposed from the bracket side surface 2502 of the bracket housing 250 and electrically connected to a substrate (e.g., the substrate 270 in FIG. 7A), the remaining conductive portions 2413c, 2413d, and 2413e may also be used as antennas operating in other frequency bands. For example, at least one of the remaining conductive portions 2413c, 2413d, and 2413e may be used as an antenna operating in a frequency band relatively higher than a frequency band in which the first conductive portion 2413a and the second conductive portion 2413b operate.

FIG. 7C is a configuration view of an electronic device including multiple conductive portions arranged to avoid an additional structure disposed on the side surface 241 of the housing 240 according to various embodiments of the disclosure.

In describing the electronic device 200 in FIG. 7C, elements substantially the same as the elements of the electronic device 200 in FIG. 7B are given the same reference numerals, and detailed descriptions thereof may be omitted.

Referring to FIG. 7C, the first side surface 241 may have a structure such as a screw hole 2416 and/or a connector port 2415, disposed therein. In this case, the first non-conductive portion 2411 may be disposed to be electrically insulated in a manner of surrounding the screw hole 2416 and/or the connector port 2415. Therefore, it may be possible to prevent the deterioration of radiation performance of the antennas A1 and A2 by a conductive screw fastened through the screw hole 2416 and/or a conductive interface connector connected through connector port 2415, and may help to prevent product liability (PL) accidents such as electric shock. In some embodiments, the screw hole 2416 and/or the connector port 2415 may be disposed in a manner of being surrounded by other non-conductive portions 2412a, 2412b, and 2412c.

FIG. 8A to FIG. 8C are configuration views of an electronic device including conductive portions arranged in various shapes through a shape change of non-conductive portions according to various embodiments of the disclosure.

In describing the electronic devices in FIG. 8A to FIG. 8C, elements substantially the same as the elements of the electronic device 200 in FIG. 7B are given the same reference numerals, and detailed descriptions thereof may be omitted.

Referring to FIG. 8A, the electronic device 200 may include the housing 240 including the first side surface 241. According to one embodiment, the first side surface 241 may be electrically connected to the first connection terminal 271 and the second connection terminal 272 which are exposed through a bracket side surface (e.g., the bracket side surface 2502 in FIG. 7A) of a bracket housing (e.g., the bracket housing 250 in FIG. 7A) disposed in an inner space (e.g., the inner space 2403 in FIG. 4) of the housing 240.

According to various embodiments, the first side surface 241 may include multiple conductive portions 814, 815, 816, 817, and 818 divided to be electrically insulated through multiple non-conductive portions 810, 811, 812, and 813. According to one embodiment, the multiple non-conductive portions 810, 811, 812, and 813 may include a second non-conductive portion 811, a third non-conductive portion 812, and a fourth non-conductive portion 813 which cross a first non-conductive portion 810. According to one embodiment, the multiple conductive portions 814, 815, 816, 817, and 818 may include a first conductive portion 814, a second conductive portion 815, a third conductive portion 816, a fourth conductive portion 817, and/or a fifth conductive portion 818. According to one embodiment, the first non-conductive portion 810 may be formed along the width direction (e.g., the direction ① of FIG. 4) of the electronic device 200. According to one embodiment, the first non-conductive portion 810 may be formed to have thicknesses t1 and t2 different from each other according to a position thereof. For example, the first non-conductive portion 810 may be formed such that opposite ends thereof have a first thickness t1, and a central portion has a second thickness t2 thicker than the first thickness t1.

According to various embodiments, the first connection terminal 271 and the second connection terminal 272 may be arranged on the imaginary line L1 parallel to the direction in which the first non-conductive portion 810 is formed, so as to be spaced apart from each other at designated intervals. In this case, the shape of the first non-conductive portion 810 may be changed to have a first terminal accommodation structure 810a for accommodating the first connection terminal 271 and a second terminal accommodating structure 810b for accommodating the second connection terminal 272 in a portion formed relatively thicker.

According to various embodiments, the first conductive portion 814 may be formed through the first non-conductive portion 810, the second non-conductive portion 811, and the third non-conductive portion 812. According to one embodiment, the second conductive portion 815 may be formed through the first non-conductive portion 810 and the third non-conductive portion 812. According to one embodiment, the first conductive portion 814 may be used as the first antenna A1 operating in the first frequency band, and the second conductive portion 815 may be used as the second antenna A2 operating in a second frequency band different from the first frequency band.

Referring to FIG. 8B, the electronic device 200 may include the housing 240 including the first side surface 241. According to one embodiment, the first side surface 241 may be electrically connected to the first connection terminal 271 and the second connection terminal 272 which are exposed through a bracket side surface (e.g., the bracket side surface 2502 in FIG. 7A) of a bracket housing (e.g., the bracket housing 250 in FIG. 7A) disposed in an inner space (e.g., the inner space 2403 in FIG. 4) of the housing 240.

According to various embodiments, the first side surface 241 may include multiple conductive portions 831, 832, 833, 834, and 835 divided to be electrically insulated through multiple non-conductive portions 820, 821, 822, and 823. According to one embodiment, the multiple non-conductive portions 820, 821, 822, and 823 may include a second non-conductive portion 821, a third non-conductive portion 822, and a fourth non-conductive portion 823 which cross a first non-conductive portion 820. According to one embodiment, the multiple conductive portions 831, 832, 833, 834, and 835 may include a first conductive portion 831, a second conductive portion 832, a third conductive portion 833, a fourth conductive portion 834, and/or a fifth conductive portion 835. According to one embodiment, the first non-conductive portion 820 may be formed along the width direction (e.g., the direction ① of FIG. 4) of the electronic device 200.

According to various embodiments, the first connection terminal 271 may be disposed on the first imaginary line L1 parallel to the direction in which the first non-conductive portion 820 is formed. According to one embodiment, the second connection terminal 273 may be disposed on the second imaginary line L2 which is parallel to the direction in which the first non-conductive portion 820 is formed, and spaced apart from the first imaginary line L1. In some embodiments, the second imaginary line L2 may not be parallel to the first imaginary line L1. In this case, the first non-conductive portion 820 may be formed in a straight shape without any terminal accommodation structure.

According to various embodiments, the first conductive portion 831 may be formed through the first non-conductive portion 820, the second non-conductive portion 821, and the third non-conductive portion 822. According to one embodiment, the second conductive portion 832 may be formed through the first non-conductive portion 820 and the third non-conductive portion 823. According to one embodiment, the first conductive portion 831 may be used as the first antenna A1 operating in the first frequency band, and the second conductive portion 832 may be used as the second antenna A2 operating in a second frequency band different from the first frequency band.

Referring to FIG. 8C, the electronic device 200 may include the housing 240 including the first side surface 241. According to one embodiment, the first side surface 241 may be electrically connected to the first connection terminal 271 and the second connection terminal 272 which are exposed through a bracket side surface (e.g., the bracket side surface 2502 in FIG. 7A) of a bracket housing (e.g., the bracket housing 250 in FIG. 7A) disposed in an inner space (e.g., the inner space 2403 in FIG. 4) of the housing 240.

According to various embodiments, the first side surface 241 may include multiple conductive portions 861, 862, 863, 864, 865, 866, and 867 divided to be electrically insulated through multiple non-conductive portions 840, 841, 842, 850, and 851. According to one embodiment, the multiple non-conductive portions 840, 841, 842, 850, and 851 may include a first non-conductive portion 840, a second non-conductive portion 841 crossing the first non-conductive portion 840, a third non-conductive portion 842, a fourth non-conductive portion 850 disposed to be at least partially parallel to and spaced apart from the first non-conductive portion 840, and a fifth non-conductive portion 851 crossing the fourth non-conductive portion 850. According to one embodiment, the multiple conductive portions 861, 862, 863, 864, 865, 866, and 867 may include a first conductive portion 861, a second conductive portion 862, a third conductive portion 863, a fourth conductive portion 864, a fifth conductive portion 865, a sixth non-conductive portion 866, and a seventh non-conductive portion 867. According to one embodiment, the first connection terminal 271 and the second connection terminal 272 may be arranged on the imaginary line L1 parallel to the direction in which the first non-conductive portion 840 is formed, so as to be spaced apart from each other at designated intervals, between the first non-conductive portion 840 and the fourth non-conductive portion 850. In this case, the first side surface 241 may include a first terminal accommodation structure 840a and a second terminal accommodation structure 850a which are provided by a shape change of at least a part of the first non-conductive portion 840 and the fourth non-conductive portion 850. According to one embodiment, the first connection terminal 271 may be electrically connected to the first conductive portion 861 through the first terminal accommodation structure 840a. According to one embodiment, the second connection terminal 272 may be electrically connected to the second conductive portion 862 through the second terminal accommodation structure 850a. According to one embodiment, the first conductive portion 861 may be used as the first antenna A1 operating in the first frequency band, and the second conductive portion 862 may be used as the second antenna A2 operating in a second frequency band different from the first frequency band.

FIG. 9A is a view showing the bracket housing 250 in which a connection terminal 282 is exposed to a bracket rear surface 2503 according to various embodiments of the disclosure.

In describing elements of the bracket housing 250 in FIG. 9A, elements substantially the same as the elements of the bracket housing 250 in FIG. 7A are given the same reference numerals, and detailed descriptions thereof may be omitted.

Referring to FIG. 9A, at least one connection terminal 282 may be exposed in a direction (the −Z-direction) facing a bracket rear surface 2503. The arrangement structure of the connection terminals 271 and 282 may be advantageous in case that multiple connection terminals have the same orientation and there is not enough an arrangement space allowing the multiple connection terminals to be exposed to a bracket side surface 2502, or there is a restriction in a design of components.

According to various embodiments, an electronic device (e.g., the electronic device 200 in FIG. 4) may include the substrate 270 disposed in an inner space (e.g., the inner space 2501 in FIG. 5B) of a bracket housing 250, and the at least one connection terminal 271 or 272 disposed on the substrate 270. According to one embodiment, the at least one connection terminal 271 or 272 may include a first connection terminal 271 exposed through the bracket side surface 2502 and a second connection terminal 282 exposed in a direction (the −Z-direction) in which a bracket rear surface 2503 faces, in a state where a slide plate 260 is coupled. According to one embodiment, the second connection terminal 282 may also be disposed on a sub-substrate 280 disposed on the bracket rear surface 2503 or the substrate 270 and electrically connected to the substrate 270. According to one embodiment, the sub-substrate 280 may be formed with a thickness for compensating for a step difference in the z-axis with the substrate 270, for the rear contact of the electronic device 200. In some embodiments, the second connection terminal 282 may be directly disposed on the substrate 270 in a direction in which the bracket rear surface 2503 faces. In some embodiments, the first connection terminal 271 may also be disposed in a direction in which the bracket rear surface 2503 faces.

FIG. 9B is a configuration view of the electronic device 200, which shows a state in which multiple conductive portions 831 and 832 formed on the first side surface 241 of the housing 240 are electrically connected to the connection terminals 271 and 282 in FIG. 9A according to various embodiments of the disclosure.

In describing elements of the electronic device 200 in FIG. 9B, elements substantially the same as the elements of the electronic device 200 in FIG. 8B are given the same reference numerals, and detailed descriptions thereof may be omitted.

Referring to FIG. 9B, the first connection terminal 271, which is exposed to the bracket side surface 2502, may be electrically connected to the first conductive portion 831 of the first side surface 241, which is electrically insulated through the first non-conductive portion 820, the second non-conductive portion 821, and the third non-conductive portion 822. According to one embodiment, the second connection terminal 282, which is exposed to the bracket rear surface 2503 and exposed in a direction (the −Z-axis direction) in which the bracket rear surface 2503 faces through the sub-substrate 280, may be electrically connected to the second conductive portion 832 of first side surface 241, which is electrically insulated through the first non-conductive portion 820 and the fourth non-conductive portion 823. In this case, the second connection terminal 282 may be in contact with the support plate 245 made of conductive material, which at least partially extends from the second conductive portion 832 to the inner space 2403 of the electronic device 200, and thus may be electrically connected to the second conductive portion 832.

FIG. 10A is a view showing the bracket housing 250 in which the connection terminal 272 are exposed to the bracket rear surface 2503 according to various embodiments of the disclosure.

In describing elements of the bracket housing 250 in FIG. 10A, elements substantially the same as the elements of the bracket housing 250 in FIG. 7A are given the same reference numerals, and detailed descriptions thereof may be omitted.

Referring to FIG. 10A, an electronic device (e.g., the electronic device 200 in FIG. 4) may include the substrate 270 disposed in an inner space (e.g., the inner space 2501 in FIG. 5B) of the bracket housing 250, and the at least one connection terminal 271 or 272 disposed on the substrate 270. According to one embodiment, the at least one connection terminal 271 or 272 may include the first connection terminal 271 exposed to the bracket side surface 2502 and the second connection terminal 272 exposed in a direction (the −Z-direction) in which a bracket rear surface 2503 faces, in a state where a slide plate 260 is coupled.

FIG. 10B and FIG. 10C is a configuration view of an electronic device 200, which shows a state in which the multiple conductive portions 831 and 832 formed on the first side surface 241 of the housing 240 are electrically connected to the connection terminals 271 and 272 in FIG. 10A according to various embodiments of the disclosure.

In describing elements of the electronic device 200 in FIG. 10B, elements substantially the same as the elements of the electronic device 200 in FIG. 8B are given the same reference numerals, and detailed descriptions thereof may be omitted.

Referring to FIG. 10B and FIG. 10C, the first connection terminal 271, which is exposed to the bracket side surface 2502, may be electrically connected to the first conductive portion 831 of the first side surface 241, which is electrically insulated through the first non-conductive portion 820, the second non-conductive portion 821, and the third non-conductive portion 822. According to one embodiment, the second connection terminal 272, which is exposed to the bracket rear surface 2503 and exposed in a direction (the −Z-axis direction) in which the bracket rear surface 2503 faces, may be electrically connected to the second conductive portion 832 of first side surface 241, which is electrically insulated through the first non-conductive portion 820 and the fourth non-conductive portion 823. In this case, the second connection terminal 272 may at least partially extend from the second conductive portion 832 to the inner space 2403 of the electronic device 200, and thus may be in contact with a step difference compensation member 246 made of a conductive material (e.g., a metal member), which compensates for a step difference in the Z-axis direction between the second connection terminal 272 and the second conductive portion 832. In some embodiments, the step difference compensation member may be provided separately rather than integrally with the second conductive portion.

FIG. 11A is a partial cross-sectional view of the electronic device 200 seen along line 11a-11a in FIG. 10B according to various embodiments of the disclosure.

Referring to FIG. 11A, the electronic device 200 may include the housing 240, the bracket housing 250 disposed in the inner space 2403 of the housing 240, the slide plate 260 which is coupled to be slidable from the bracket housing 250 and includes a hinge rail (e.g., the hinge rail 261 in FIG. 5B), the flexible display 230 disposed to be supported by the slide plate 260, and the rear cover 221 coupled to the housing 240. According to one embodiment, an electronic device (e.g., the electronic device 200 in FIG. 4) may include the bracket housing 250, the substrate 270 disposed in an inner space (e.g., the inner space 2501 in FIG. 5B) of the bracket housing 250, and the first connection terminal 271 disposed on the substrate 270 and exposed to the bracket side surface 2502 through the bracket housing 250. According to one embodiment, the slide plate 260 may be configured such that the third guide rail 262 of a hinge rail (e.g., the hinge rail 261 in FIG. 5B) is slidably coupled to the first guide rail 2511 of the first bracket 251, and the fourth guide rail 263 of the hinge rail (e.g., the hinge rail 261 in FIG. 5B) is slidably coupled to the second guide rail 2521 of the second bracket 252, and thus may be slidably disposed with reference to the bracket housing 250.

According to various embodiments, the first side surface 241 of the housing 240 may include a conductive material 241*a* and a non-conductive material 241*b* coupled to the conductive material 241*a*. According to one embodiment, the first side surface 241 may be formed by injecting (insert-injecting or double-injecting) the non-conductive material 241*b* into the conductive material 241*a*, or through structural coupling. According to one embodiment, the first side surface 241 may have a conductive material 241*a* divided into multiple conductive portions (e.g., the conductive portions 831 and 832 in FIG. 10B) through non-conductive portions (e.g., the non-conductive portions 820, 821, 822, and 823 in FIG. 10B) formed of the non-conductive material 241*b*. According to one embodiment, the at least one conductive portion 831 of multiple conductive portions (e.g., the conductive portions 831 and 832 in FIG. 10B) may be physically and electrically connected to the first connection terminal 271 exposed to the bracket side surface 2502 of the bracket housing 250. For example, the conductive material 241*a* may form the first conductive portion 831 electrically disconnected from a conductive material area therearound through an injection area (e.g., the first non-conductive portion 820) of the non-conductive material 241*b*. According to one embodiment, the first conductive portion 831 of the first side surface 241 may be electrically connected to the first connection terminal 271 from the Y-axis direction through the first conductive connection part 241*c* extending from the conductive material 241*a* to the first connection terminal 271 through (passing through) the non-conductive material 241*b*.

Hereinafter, in describing the electronic device 200 in FIG. 11B to 11D, elements substantially the same as the elements of the electronic device 200 in FIG. 11A are given the same reference numerals, and detailed descriptions thereof may be omitted.

FIG. 11B is a partial cross-sectional view of the electronic device 200 seen along line 11b-11b in FIG. 10B according to various embodiments of the disclosure.

Referring to FIG. 11B, at least one conductive portion (e.g., the second conductive portion 832 in FIG. 10B) of multiple conductive portions (e.g., the conductive portions 831 and 832 in FIG. 10B) may be physically and electrically connected to the first connection terminal 271 exposed to the bracket rear surface 2503 of the bracket housing 250. According to one embodiment, a second conductive portion (e.g., the second conductive portion 832 in FIG. 10B) of the first side surface 241 may be electrically connected to the second connection terminal 272 through a second conductive connection part 241*d* extending from the conductive material 241*a* to the second connection terminal 272 through (passing through) the non-conductive material 241*b*. In this case, the second conductive portion 832 of the first side surface 241 may be electrically connected to the second connection terminal 272, which is exposed to the bracket rear surface 2503 of the bracket housing 250 through the second conductive connection part 241*d*, from the Z-axis direction. The connection structure may be advantageously used under an arrangement condition in which both of the multiple connection terminals 271 and 272 are difficult to be exposed to the bracket side surface 2502.

FIG. 11C and FIG. 11D are partial cross-sectional views of an electronic device, which illustrate a state in which the connection terminal 271 and a conductive portion 241*a* of the first side surface 241 are electrically connected according to various embodiments of the disclosure.

As illustrated in FIG. 11C, a first conductive portion (e.g., the first conductive portion 831 in FIG. 10B) of the first side surface 241, which is formed of the conductive material 241*a*, may be coupled to the first conductive material 241*a*, and may be electrically connected to the first connection terminal 271 exposed to the bracket side surface 2502, from the Y-axis direction, through a first conductive connection member 241*e* (e.g., a conductive pin or a conductive screw) disposed to pass through the non-conductive material 241*b*.

As illustrated in FIG. 11D, a second conductive portion (e.g., the second conductive portion 832 in FIG. 10B) of the first side surface 241, which is formed of the conductive material 241*a*, may be coupled to the first conductive material 241*a*, and may be electrically connected to the second connection terminal 272 exposed to the bracket rear surface 2503, from the Z-axis direction, through a second conductive connection member 241*f* (e.g., a conductive pin or a conductive screw) disposed to pass through the non-conductive material 241*b*.

FIG. 12A and FIG. 12B are front perspective views showing a drawn-in state and a drawn-out state of an electronic device according to various embodiments of the disclosure. FIG. 13A and FIG. 13B are rear perspective views showing a drawn-in state and a drawn-out state of an electronic device according to various embodiments of the disclosure.

FIG. 12A and FIG. 12B are front perspective views showing a drawn-in state and a drawn-out state of an electronic 300 according to various embodiments of the disclosure. FIG. 13A and FIG. 13B are front perspective views showing a drawn-in state and a drawn-out state of an electronic 300 according to various embodiments of the disclosure.

The electronic device 300 in FIG. 12A may be at least partially similar to the electronic device 101 in FIG. 1, and other embodiments of an electronic device may be included therein.

Referring to FIGS. 12A, 12B, 13A, and 13B, the electronic device 300 may include a first housing 310 and a second housing 320 at least partially movably coupled to the first housing 310. According to one embodiment, the first housing 310 may include a first plate 311 and a first side frame 312 extending along the edge of the first plate 311 in a substantially vertical direction (e.g., the z-axis direction). According to an embodiment, the first side frame 312 may include a first side surface 3121, a second side surface 3122 extending from one end of the first side surface 3121, and a third side surface 3123 extending from the other end of the first side surface 3121. According to one embodiment, the first housing 310 may include a first space (e.g., the first space 3101 in FIG. 14A) which is at least partially dented through the first plate 311 and the first side surface frame 312 from the outside.

According to various embodiments, the second housing 320 may include a second plate 321 and a second side frame 322 extending along the edge of the second plate 321 in a substantially vertical direction (e.g., the z-axis direction). According to one embodiment, the second side frame 322 may include a fourth side surface 3221 oriented in a direction opposite to the first side surface 3121, a fifth side surface 3222 which extends from one end of the fourth side surface 3221 and is at least partially coupled to the second side surface 3122, and a sixth side surface 3223 which extends from the other end of the fourth side surface 3221 and is at least partially coupled to the third side surface 3123. As another embodiment, the fourth side surface 3221 may extend from a structure other than the second plate 321, and may be coupled to the second plate 321. According to one embodiment, the second housing 320 may include a second space (e.g., the second space 3201 in FIG. 14A) which is at least partially dented through the second plate 321 and the second side surface frame 322 from the outside. According to one embodiment, the first plate 311 and the second plate 321 may be arranged to at least partially form the rear surface of the electronic device 300. For example, the first plate 311, the second plate 321, the first side frame 312, and the second side frame 322 may be formed of polymer, coated or tinted glass, ceramic, metal (e.g., aluminum, stainless steel (STS), or magnesium), or a combination of at least two of the above-materials.

According to various embodiments, the electronic device 300 may include a flexible display 330 disposed to be supported by the first housing 310 and the second housing 320. According to one embodiment, the electronic device 300 may be configured such that the first housing 310 is at least partially inserted into a second space (e.g., the second space 3201 in FIG. 14A) of the second housing 320, and is coupled to be movable in the illustrated direction ①. For example, in a drawn-in state of the electronic device 300, a coupled state between the first housing 310 and the second housing 320 may be maintained such that a first distance d1 is formed between the first side surface 3121 and the fourth side surface 3221, and thus the flexible display 330 may have a display area of a first size. According to one embodiment, in a drawn-out state of the electronic device 300, the state, in which the first housing 310 protrudes from the second housing 320, may be maintained such that a second spaced distance d, in which the first side surface 3121 protrudes from the fourth side surface 3221 by a predetermined distance d2, is formed, and thus the flexible display 330 may have an extended display area having a second size larger than the first size. According to one embodiment, in a drawn-out state, both ends of the flexible display 330 may be formed as curved edges having a curved shape, and may be supported by the first housing 310 and/or the second housing 320.

According to various embodiments, a state of the electronic device 300 may be automatically switchable into a drawn-out state or a drawn-in state by a driving unit (not shown) disposed in a first space (e.g., the first space 3101 in FIG. 14A) and/or a second space (e.g., the second space 3201 in FIG. 14A). In some embodiments, the first housing 310 may manually protrude from the second housing 320 through user manipulation. In this case, the first housing 310 may protrude by a distance required by a user, and thus the flexible display 330 may also be changed to have a display area of various sizes. Accordingly, a processor (e.g., the processor 120 in FIG. 1) of the electronic device 300 may also control the flexible display 330 so as to display an object in various types and execute an application program, in response to the changed display area of the first housing 310.

According to various embodiments, the electronic device 300 may include at least one of an input device 303, sound output devices 306 and 307, sensor modules 304 and 317, camera modules 305 and 316, a connector port 308, a key input device (not shown), or an indicator (not shown). As another embodiment, at least one of the elements described above may be omitted from electronic device 300, or other elements may be additionally included therein.

According to various embodiments, the input device 303 may include a microphone 303. In some embodiments, the input device 303 may also include multiple microphones 303 arranged to sense the direction of sound. The sound output devices 306 and 307 may include speakers 306 and 307. The speakers 306 and 307 may include an external speaker 306 and a receiver 307 for phone calls. As another embodiment, in case that an external speaker 306' is disposed in the first housing 310, in a drawn-in state, it may be configured to output sound through the speaker hole 306 formed through the second housing 320. According to one embodiment, the microphone 303 or the connector port 308 may also be formed to have substantially the same configuration. As another embodiment, the sound output devices 306 and 307 may also include a speaker (e.g., a piezo speaker) which is operated while a separate hole 306 is excluded.

According to various embodiments, the sensor modules 304 and 317 may generate an electrical signal or a data value corresponding to an internal operation state of the electronic device 300 or an external environmental state. For example, the sensor modules 304 and 317 may include a first sensor module 304 (e.g., a proximity sensor or an illuminance sensor) disposed on the front surface of the second housing 320, and/or a second sensor module 317 (e.g., an HRM sensor) disposed on the rear surface of the second housing 320. According to one embodiment, the first sensor module 304 may be disposed under the flexible display 330 in the second housing 320. According to one embodiment, the first sensor module 304 may further include at least one of a proximity sensor, an illuminance sensor 204, a time of flight (TOF) sensor, an ultrasonic sensor, a fingerprint recognition sensor, a gesture sensor, a gyro sensor, a barometric pressure sensor, a magnetic sensor, an acceleration sensor, a grip sensor, a color sensor, an infrared (IR) sensor, a biometric sensor, a temperature sensor, or a humidity sensor.

According to various embodiments, the camera devices 305 and 316 may include a first camera device 305 disposed on the front surface of the second housing 320 of the electronic device 300, and a second camera device 316 disposed on the rear surface of the second housing 320. According to one embodiment, the electronic device 300 may include a flash 318 positioned near the second camera device 316. According to one embodiment, the camera devices 305 and 316 each may include one lens or multiple lenses, an image sensor, and/or an image signal processor. According to one embodiment, the first camera device 305 may be disposed under the flexible display 330 and be configured to photograph a subject through a part of an active area of the flexible display 330. According to one embodiment, for example, the flash 318 may include a light-emitting diode or a xenon lamp. In some embodiments, two or more lenses (a wide-angle lens and a telephoto lens) and image sensors may be arranged on one surface of the electronic device 300.

According to various embodiments, the electronic device 300 may include at least one antenna (not shown). According to one embodiment, for example, the at least one antenna may wirelessly communicate with an external electronic device (e.g., the electronic device 104 in FIG. 1), or wirelessly transmit/receive power required for charging. According to one embodiment, the antenna may include a legacy antenna, a mmWave antenna, a near field communication (NFC) antenna, a wireless charging antenna, and/or a magnetic secure transmission (MST) antenna. As another embodiment, an antenna structure may be formed through at least a part of the first side frame 312 and/or the second side frame 322 formed of metal.

According to various embodiments, the electronic device 300 may include multiple conductive portions 341, 342, 343, and 344 formed through the fifth side surface 3222 of the second side frame 322. According to one embodiment, the multiple conductive portions 341, 342, 343, and 344 may be arranged to be electrically disconnected through multiple non-conductive portions 331, 332, and 333. For example, the multiple non-conductive portions 331, 332, and 333 may include a first non-conductive portion 331 disposed along the width direction of an electronic device, a second non-conductive portion 332 crossing in a direction perpendicular to the first non-conductive portion 331, and a third non-conductive portion 333. According to one embodiment, the multiple conductive portions 341, 342, 343, and 344 may include a first conductive portion 341, a second conductive portion 342, a third conductive portion 343, and a fourth conductive portion 344 which are arranged through the multiple non-conductive portions 331, 332, and 333. According to one embodiment, the electronic device 300 may use at least one conductive portion 341 or 342 of the multiple conductive portions 341, 342, 343, and 344 as an antenna. According to one embodiment, the electronic device 300 may include a wireless communication circuit (e.g., the wireless communication module 192 in FIG. 1), and may be electrically connected to at least one conductive portion 341 or 342 of the multiple conductive portions 341, 342, 343, and 344 and thus may be configured to transmit and/or receive a wireless signal in a designated frequency band (e.g., a legacy band). In some embodiments, as described above on the sixth side surface 3223, the electronic device 300 may include at least one additional antenna disposed through the multiple conductive portions 341, 342, 343, and 344 and the multiple non-conductive portions 331, 332, and 333.

FIG. 14A and FIG. 14B are schematic views showing an electrical connection structure between the connection terminals 371 and 372 and a conductive side surface 3222 in case that an electronic device is in a drawn-in state and a drawn-out state according to various embodiments of the disclosure.

Referring to FIG. 14A and FIG. 14B, the electronic device 300 may include the first housing 310 and the second housing 320. According to one embodiment, in a drawn-in state, the first housing 310 may be maintained in the state of being inserted into the second space 3201 of the second housing 320. According to one embodiment, in a withdrawal, the first housing 310 may be maintained in the state of being withdrawn from the second space 3201 of the second housing 320 to the outside by a designated distance.

According to various embodiments, the electronic device 300 may include the substrate 370 disposed in the first space 3101 of the first housing 310. According to one embodiment, the electronic device 300 may include a first connection terminal 371 and a second connection terminal 372 electrically connected to the substrate 370, exposed to face the fifth side surface 3222 through the second side surface 3122, and disposed at designated intervals. According to one embodiment, the first connection terminal 371 and the second connection terminal 372 may be arranged on the same line or different lines along the width direction (e.g., the direction ① in FIG. 12B) of the electronic device 300. According to one embodiment, the first conductive portion 341 may be electrically connected to the first connection terminal 371, and thus may be used as the first antenna A1 operating in the first frequency band. According to one embodiment, the second conductive portion 342 may be electrically connected to the second connection terminal 372, and thus may be used as the second antenna A2 operating in the second frequency band different from the first frequency band. According to one embodiment, the first connection terminal 371 and/or the second connection terminal 372 may include a C-clip, a pogo pin, a conductive tape, or an FPCB having a conductive terminal exposed therefrom.

According to various embodiments, in case that a state of the electronic device 300 is switched from a drawn-in state to a drawn-out state, the substrate 370 disposed on the first housing 310, and the first connection terminal 371 and the second connection terminal 372 exposed to the second side surface 3122 may be moved together. In this case, the first connection terminal 371 and the second connection terminal 372 may have a changeable contact position with the fifth side surface 3222, but may be electrically connected to corresponding conductive portions 341 and 342 of the fifth side surface 3222 formed in a designated shape through an appropriate shape change of the non-conductive portions 331, 332, and 333 and then may be maintained in the state. For example, although a state of the electronic device 300 is switched from a drawn-in state to a drawn-out state, the first connection terminal 371 may be electrically connected to the first conductive portion 341 through at least one terminal accommodation structure formed through the first non-conductive portion 331 and then may be maintained in the state. According to one embodiment, although a state of the electronic device 300 is switched from a drawn-in state to a drawn-out state, the second connection terminal 372 may also be electrically connected to the second conductive portion 342 through at least one terminal accommodation structure formed through the first non-conductive portion 331 and then may be maintained in the state. In some embodiments, the at least one terminal accommodation structure may also be formed through not only the first non-conductive portion 331 but also the second non-conductive portion 332 and/or the third non-conductive portion 333. In some embodiments, the first connection member 371 and/or the second connection member 372 may be electrically connected to at least one conductive portion (e.g., the first conductive portion 341 or the second conductive portion 342) of conductive portions by using at least a part of a rear plate (e.g., the rear plate 311 in FIG. 13B) of the electronic device 300 or through a terminal compensation structure, in case of having an arrangement structure which may not be exposed through the second side surface 3122. In some embodiments, the electronic device 300 may include a side cover (e.g., the first side cover 240a in FIG. 2A) disposed on the fifth side surface, and thus the non-conductive portions 331, 332, and 333 and the conductive portions 341, 342, 343, and 344 may not be exposed to the outside.

According to various embodiments, an electronic device may include a housing (e.g., the housing 240 in FIG. 4) which includes a first surface (e.g., the first surface 2401 in FIG. 4) oriented in a first direction (e.g., the Z-axis direction in FIG. 2A), a second surface (e.g., the second surface 2402 in FIG. 4) oriented in a second direction (e.g., –the Z-axis direction in FIG. 2A) opposite to the first surface, and at least one side surface (e.g., the first side surface 241 in FIG. 4) surrounding a space (e.g., the space 2403 in FIG. 4) between the first surface and the second surface, and is at least partially formed of a conductive material, a slide plate (e.g., the slide plate 260 in FIG. 4) coupled to the housing so as to be slidable in a third direction (e.g., the X-axis direction in FIG. 2A) perpendicular to the first direction, a flexible display (e.g., the flexible display 230 in FIG. 4) disposed to be at least partially supported by the slide plate, multiple conductive portions (e.g., the conductive portions 2413a, 2413b, 2413c, 2413d, and 2413e in FIG. 4) formed to be electrically segmented through at least one first non-conductive portion (e.g., the first non-conductive portion 2411 in FIG. 4) formed along the third direction and at least one second non-conductive portion (e.g., the multiple non-conductive portions 2412a, 2412b, and 2412c in FIG. 4) formed to cross the first non-conductive portion, on the at least one side surface, a substrate (e.g., the substrate 270 in FIG. 5B) disposed in the space, and a wireless communication circuit (e.g., the wireless communication module 192 in FIG. 1) disposed on the substrate and configured to transmit and/or receive a wireless signal in at least one frequency band through the multiple conductive portions.

According to various embodiments, at least one connection terminal, which is electrically connected to the substrate and disposed to face the multiple conductive portions, may be included therein.

According to various embodiments, the multiple conductive portions may include a first conductive portion and a second conductive portion disposed to be spaced apart from the first conductive portion, and the at least one connection terminal may include a first connection terminal electrically connected to the first conductive portion and a second connection terminal electrically connected to the second conductive portion.

According to various embodiments, the first connection terminal and the second connection terminal may be arranged on the same line along the third direction.

According to various embodiments, the first connection terminal and the second connection terminal may be arranged on lines different from each other along the third direction.

According to various embodiments, the first connection terminal and/or the second connection terminal may be disposed to face the at least one side surface from the substrate.

According to various embodiments, the first connection terminal and/or the second connection terminal may be disposed to be oriented in the second direction from the substrate.

According to various embodiments, a conductive connection structure, which extends from the first conductive portion and/or the second conductive portion to the first connection terminal and/or the second connection terminal, may be included therein, and the first connection terminal and/or the second connection terminal may be electrically connected to the first conductive portion and/or the second conductive portion through the conductive connection structure.

According to various embodiments, the conductive connection structure may include a conductive connection part integrally formed with the first conductive portion and/or the second conductive portion.

According to various embodiments, the conductive connection structure may include a conductive connection member connecting the first conductive portion and/or the second conductive portion to the first connection terminal and/or the second connection terminal.

According to various embodiments, the conductive connection member may include a conductive pin or a conductive screw having a designated length.

According to various embodiments, a bracket housing, which is disposed to support at least a part of the slide plate, in the space, and has an inner space, may be included therein, and the substrate may be disposed in the inner space.

According to various embodiments, the at least one connection terminal may be exposed from the substrate to a bracket side surface of the bracket housing, which faces the at least one side surface, so as to be electrically connected to at least one of the multiple conductive portions.

According to various embodiments, the at least one connection terminal may be exposed from the substrate to a bracket rear surface of the bracket housing, which faces the second surface, so as to be electrically connected to at least one of the multiple conductive portions.

According to various embodiments, a side cover, which is disposed on the at least one side surface, may be included therein, and the at least one first non-conductive portion, the at least one second non-conductive portion, and the multiple conductive portions, which are formed on the at least one side surface, may not be exposed to the outside through the side cover.

According to various embodiments, an electronic device (e.g., the electronic device 300 in FIG. 12B) may include a first housing (e.g., the first housing 310 in FIG. 12B) including a first space (e.g., the first space 3101 in FIG. 14B) and including a first side surface (e.g., the second side surface 3122 in FIG. 13B), a second housing (e.g., the second housing 320 in FIG. 12B) including a second space (e.g., the second space 3201 in FIG. 14B) in which the first housing is slidably accommodated in a first direction (e.g., the direction ① in FIG. 12B) such that a state of the first housing is switched to a drawn-out state and a drawn-in state, and including a second side surface (e.g., the fifth side surface 3222 in FIG. 12B) corresponding to the first side surface, a flexible display (e.g., the flexible display 330 in FIG. 12B) disposed to be supported by the first housing and the second housing, the flexible display including a flat surface part facing the second housing and a bendable part which extends from the flat surface part and is not exposed to the outside by being positioned in the first space in the drawn-in state, at least a part of the bendable part being exposed to the outside so as to form substantially the same plane as the flat surface part in case of being switched from the drawn-in state to the drawn-out state, multiple conductive portions (e.g., the conductive portions 341, 342, 343, and 344 in FIG. 12A) formed to be electrically segmented through at least one first non-conductive portion (e.g., the first non-conductive portion 331 in FIG. 12A) formed along the first direction and at least one second non-conductive portion (e.g., the second non-conductive portion 332 and the third non-conductive portion 333 in FIG. 12A) formed to cross the first non-conductive portion, in the second side surface, a substrate (e.g., the substrate 370 in FIG. 14A) disposed in the first space, and a wireless communication circuit (e.g., the wireless communication module 192 in FIG. 1) disposed on the substrate, electrically connected to the multiple conductive portions, and thus configured to transmit and/or receive a wireless signal in at least one frequency band.

According to various embodiments, at least one connection terminal, which is electrically connected to the substrate and disposed to face the multiple conductive portions, may be included therein.

According to various embodiments, the at least one connection terminal may be disposed to face the second side surface from the substrate, may pass through the first side surface, and may be in physical contact with the second side surface.

According to various embodiments, the at least one connection terminal may be continuously electrically connected to at least one conductive terminal of the multiple conductive terminals while a state of the first housing is switched to the drawn-in state and the drawn-out state.

According to various embodiments, a side cover, which is disposed on the at least one second side surface, may be included therein, and the at least one first non-conductive portion, the at least one second non-conductive portion, and the multiple conductive portions, which are formed on the second side surface, may not be exposed to the outside through the side cover.

Embodiments of the disclosure disclosed in the specification and the drawings are merely specific examples presented to easily describe the technical content according to the embodiments of the disclosure and to help understanding of the embodiments of the disclosure, and are not intended to limit the scope of embodiments of the disclosure. Accordingly, in connection with the scope of various embodiments of the disclosure, it should be interpreted that not only embodiments disclosed herein but also all changed or modified forms derived based on the technical idea of various embodiments of the disclosure are included in the scope of various embodiments of the disclosure.

What is claimed is:

1. An electronic device comprising:
a housing comprising a first surface disposed in a first direction, a second surface disposed in a second direction opposite to the first surface, and at least one side surface partially surrounding a space between the first surface and the second surface, the housing being at least partially formed of a conductive material;
a slide plate coupled to the housing so as to be slidable in a third direction perpendicular to the first direction;
a flexible display disposed to be at least partially supported by the slide plate;
multiple conductive portions formed to be electrically segmented by at least one first non-conductive portion formed along the third direction and at least one second non-conductive portion formed to cross the first non-conductive portion, on the at least one side surface;
a substrate disposed in the space;
a wireless communication circuit disposed on the substrate and configured to transmit and receive a wireless signal in at least one frequency band through the multiple conductive portions;
at least one connection terminal electrically connected to the substrate and disposed to face the multiple conductive portions; and
a bracket housing disposed to support at least a part of the slide plate, in the space, and having an inner space,
wherein the substrate is disposed in the inner space of the bracket housing, and
wherein the at least one connection terminal is exposed through an opening in the bracket housing to be in contact with the multiple conductive portions.

2. The electronic device of claim 1, wherein the multiple conductive portions comprise a first conductive portion and a second conductive portion disposed to be spaced apart from the first conductive portion, and
wherein the at least one connection terminal comprises a first connection terminal electrically connected to the first conductive portion and a second connection terminal electrically connected to the second conductive portion.

3. The electronic device of claim 2, wherein the first connection terminal and the second connection terminal are arranged on a line along the third direction.

4. The electronic device of claim 2, wherein the first connection terminal is arranged on a first line and the second connection terminal is arranged on a second line that is different from the first line, and both the first and the second lines disposed along the third direction.

5. The electronic device of claim 2, wherein at least one of the first connection terminal and the second connection terminal is disposed to face the at least one side surface from the substrate.

6. The electronic device of claim 2, wherein at least one of the first connection terminal and the second connection terminal is disposed in the second direction from the substrate.

7. The electronic device of claim 6, further comprising:
a conductive connection structure extending from at least one of the first conductive portion and the second conductive portion to at least one of the first connection terminal and the second connection terminal,
wherein at least one of the first connection terminal and the second connection terminal is electrically connected to at least one of the first conductive portion and the second conductive portion through the conductive connection structure.

8. The electronic device of claim 7, wherein the conductive connection structure comprises a conductive connection part integrally formed with at least one of the first conductive portion and the second conductive portion.

9. The electronic device of claim 7, wherein the conductive connection structure comprises a conductive connection member connecting at least one of the first conductive portion and the second conductive portion to at least one of the first connection terminal and the second connection terminal.

10. The electronic device of claim 9, wherein the conductive connection member comprises a conductive pin or a conductive screw having a designated length.

11. The electronic device of claim 1, wherein the at least one connection terminal is exposed from the substrate to a bracket side surface of the bracket housing, which faces the at least one side surface, so as to be electrically connected to at least one of the multiple conductive portions.

12. The electronic device of claim 1, wherein the at least one connection terminal is exposed from the substrate to the bracket rear surface of the bracket housing, which faces second surface, so as to be electrically connected to at least one of the multiple conductive portions.

13. The electronic device of claim 1, further comprising:
a side cover disposed on the at least one side surface,
wherein the at least one first non-conductive portion, the at least one second non-conductive portion, and the multiple conductive portions, which are formed on the at least one side surface, are not exposed to the outside through the side cover.

14. An electronic device comprising:
a first housing including a first space and a first side surface;

a second housing including a second space in which the first housing is slidably accommodated in a first direction such that a state of the first housing is switched to a drawn-out state and a drawn-in state, and a second side surface corresponding to the first side surface;

a flexible display disposed to be supported by the first housing and the second housing;

multiple conductive portions formed to be electrically segmented through at least one first non-conductive portion formed along the first direction and at least one second non-conductive portion formed to cross the first non-conductive portion, in the second side surface;

a substrate disposed in the first space;

a wireless communication circuit disposed on the substrate, electrically connected to the multiple conductive portions, and thus configured to transmit and/or receive a wireless signal in at least one frequency band; and at least one connection terminal, which is electrically connected to the substrate and disposed to face the multiple conductive portions, wherein the at least one connection terminal is exposed from the first housing by passing through the first side surface to be in contact with the multiple conductive portions, and wherein the at least one connection terminal is continuously electrically connected to at least one conductive terminal of the multiple conductive terminals while a state of the first housing is switched to the drawn-in state and the drawn-out state.

15. The electronic device of claim 14, further comprising a side cover, which is disposed on the at least one second side surface, included therein, wherein the at least one first non-conductive portion, the at least one second non-conductive portion, and the multiple conductive portions, which are formed on the second side surface, are not be exposed to the outside through the side cover.

* * * * *